US009791204B2

(12) United States Patent
Kim et al.

(10) Patent No.: US 9,791,204 B2
(45) Date of Patent: Oct. 17, 2017

(54) REFRIGERATOR DOOR AND MANUFACTURING METHOD OF THE SAME

(71) Applicant: LG ELECTRONICS INC., Seoul (KR)

(72) Inventors: Hyunki Kim, Seoul (KR); Minchel Kim, Seoul (KR); Seungje Park, Seoul (KR); Kihyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 14/724,997

(22) Filed: May 29, 2015

(65) Prior Publication Data

US 2016/0003519 A1 Jan. 7, 2016

(30) Foreign Application Priority Data

Jul. 6, 2014 (KR) ........................ 10-2014-0089769
Oct. 15, 2014 (KR) ........................ 10-2014-0139135

(51) Int. Cl.
*G06F 3/045* (2006.01)
*F25D 23/02* (2006.01)
(Continued)

(52) U.S. Cl.
CPC ........... *F25D 23/02* (2013.01); *F25D 29/005* (2013.01); *F21Y 2115/10* (2016.08); *F25D 2400/18* (2013.01); *F25D 2400/361* (2013.01)

(58) Field of Classification Search
CPC ........ F25D 29/005; H04N 5/2252; G09F 3/00
(Continued)

(56) References Cited

U.S. PATENT DOCUMENTS 5,487,276 A * 1/1996 Namisniak ................ G09F 9/00 116/308
7,155,923 B2 1/2007 Nam et al.
(Continued)

FOREIGN PATENT DOCUMENTS

CN 101939605 1/2011
CN 103604275 2/2014
(Continued)

OTHER PUBLICATIONS

Notice of Allowance issued in Korean Application No. 10-2014-0139136 on Sep. 13, 2016, 2 pages.
(Continued)

*Primary Examiner* — Calvin C Ma
(74) *Attorney, Agent, or Firm* — Fish & Richardson P.C.

(57) ABSTRACT

A refrigerator door and a manufacturing method of the same are disclosed. The refrigerator door includes a front panel that includes a first through hole and an input unit, a door liner, an upper cap decoration unit configured to seal an upper side of a first space defined between the front panel and the door liner, a frame attached to an inside of the front panel and defining a second space, a display assembly provided between the frame and the front panel and configured to emit light through the first through hole, and a touch sensor assembly provided between the frame and the front panel, the touch sensor assembly being fixed to a rear of the front panel at a position that corresponds to a location of the input unit. The upper cap decoration unit includes a communication hole for communicating with the second space and includes a cap cover.

20 Claims, 26 Drawing Sheets

(51) Int. Cl.
*F25D 29/00* (2006.01)
*F21Y 115/10* (2016.01)

(58) Field of Classification Search
USPC ..................... 345/174; 312/403, 405; 362/92
See application file for complete search history.

(56) References Cited

U.S. PATENT DOCUMENTS

| | | | | |
|---|---|---|---|---|
| 8,608,330 | B2 | 12/2013 | Kim | |
| 8,770,684 | B2 * | 7/2014 | Kim | F25D 29/005 312/405.1 |
| 2006/0096303 | A1 * | 5/2006 | Kavounas | F25D 29/00 62/125 |
| 2010/0283573 | A1 * | 11/2010 | Yum | F25D 29/00 340/3.1 |
| 2010/0313592 | A1 | 12/2010 | Pae | |
| 2013/0327075 | A1 | 12/2013 | Kim | |
| 2014/0293060 | A1 * | 10/2014 | Ryu | H04N 5/2252 348/159 |
| 2014/0300265 | A1 * | 10/2014 | Lee | F25D 29/00 312/405.1 |

FOREIGN PATENT DOCUMENTS

| | | |
|---|---|---|
| JP | 2002-071256 | 3/2002 |
| KR | 20-1999-0007857 | 2/1999 |
| KR | 20-0272167 | 4/2002 |
| KR | 10-0578400 | 6/2006 |
| KR | 10-2006-0111006 | 10/2006 |
| KR | 10-2009-0090518 | 8/2009 |
| KR | 10-2012-0015249 | 2/2012 |
| KR | 10-1262370 | 5/2013 |
| KR | 10-2014-0105900 | 9/2014 |
| WO | 2009/104859 | 8/2009 |
| WO | 2014/168391 | 10/2014 |

OTHER PUBLICATIONS

Chinese Office Action issued in Chinese Application No. 201510140777.2 dated Jun. 27, 2017, 17 pages.

* cited by examiner

| PUSH PART NUMBER | EMBODIMENT | MODIFICATION |
|---|---|---|
| | Force (Kgf) | Force (Kgf) |
| 1 | 0.45 | 0.35 |
| 2 | 0.3 | 0.3 |
| 3 | 0.25 | 0.2 |
| 4 | 0.3 | 0.3 |
| 5 | 0.55 | 0.3 |

REFRIGERATOR DOOR AND MANUFACTURING METHOD OF THE SAME

Pursuant to 35 U.S.C. §119(a), this application claims the benefit of Korean Patent Application No. 10-2014-0089769 filed on Jul. 16, 2014, and Korean Patent Application No. 10-2014-0139135 filed on Oct. 15, 2014, which are hereby incorporated by reference as if fully set forth herein.

TECHNICAL FIELD

The present application relates to a refrigerator door and a manufacturing method of the same, and more particularly, to a refrigerator door having a front panel made of a steel material and a manufacturing method of the same.

BACKGROUND

Based on arrangement of a refrigerator compartment and a freezer compartment, a refrigerator may be classified as a top mount type refrigerator, in which the freezer compartment is disposed above the refrigerator compartment, a side by side type refrigerator, in which the refrigerator compartment and the freezer compartment are partitioned such that the freezer compartment is disposed at the left side of the refrigerator and the refrigerator compartment is disposed at the right side of the refrigerator, or a bottom freezer type refrigerator, in which the freezer compartment is disposed under the refrigerator compartment.

The side by side type refrigerator is a large capacity refrigerator having various functions. The freezer compartment and the refrigerator compartment are disposed at the left and right sides of the refrigerator, respectively, in a state in which the freezer compartment and the refrigerator compartment are parallel to each other in a vertical direction. An evaporator is provided at the rear of the freezer compartment for suctioning air from the freezer compartment and the refrigerator compartment to the lower part of the refrigerator and discharging the air to the upper part of the refrigerator such that the air circulates in the respective compartments to perform a refrigerating function and a freezing function.

Typically, refrigerator doors are hingedly mounted at the front of the refrigerator. In a state in which the freezer compartment and the refrigerator compartment are closed, the refrigerator doors are exposed to a user. In order to provide an aesthetically pleasing appearance to the user, therefore, the front of each of the refrigerator doors may be decorated in various forms. For example, a front panel having various patterns can be attached to each of the refrigerator doors.

In recent years, popularity of general electric home appliances made of a steel material has increased, and thus research has been conducted to manufacture a refrigerator door using a steel material.

In a case in which the refrigerator door is made of a steel material, however, various problems may occur when, for example, a display for informing a user of user selection keys for controlling operation of the refrigerator and an operation state based on the user selection is mounted at the refrigerator door.

SUMMARY

Accordingly, an object of the present application is to provide a refrigerator door having a front panel made of a steel material and a manufacturing method of the same.

Another object of the present application is to provide a refrigerator door that is capable of providing information to a user through a front panel made of a steel material and receiving a command from the user through the front panel and a manufacturing method of the same.

Additional advantages, objects, and features of the application will be set forth in part in the description which follows and in part will become apparent to those having ordinary skill in the art upon examination of the following or may be learned from practice of the application. The objectives and other advantages of the application may be realized and attained by the structure particularly pointed out in the written description and claims hereof as well as the appended drawings.

According to one aspect, a refrigerator door includes a front panel made of a steel material, the front panel being provided at a front of the refrigerator door and forming a front appearance of the refrigerator door, the front panel including a first through hole and an input unit, a door liner forming a rear appearance of the refrigerator door, an upper cap decoration unit configured to seal an upper side of a first space defined between the front panel and the door liner, a frame attached to an inside of the front panel and defining a second space that is separated from the first space defined by the front panel, the door liner, and the upper cap decoration unit, a display assembly provided between the frame and the front panel and configured to emit light through the first through hole, and a touch sensor assembly provided between the frame and the front panel, the touch sensor assembly being fixed to a rear of the front panel at a position that corresponds to a location of the input unit. The upper cap decoration unit includes a communication hole for communicating with the second space defined between the frame and the front panel and includes a cap cover configured to seal the communication hole.

Implementations according to this aspect may include one or of the following features. For example, the display assembly may include a cover display mounted at the front panel, a frame display slidably coupled to the cover display, and a display unit coupled to the frame display. The cover display may be provided at opposite ends of the refrigerator door via guide rails that are configured to receive and fix the frame display. Each of the guide rails may include a protruding guide member that is configured to guide the display unit such that the display unit moves toward the front panel, and the frame display may include a protrusion that is configured to guide the display unit such that the display unit moves toward the front panel. The cover display may include a second through hole that communicates with the first through hole. The display unit may include a reflector including a third through hole and a printed circuit board (PCB) coupled to the reflector, and a light emitting diode (LED) mounted at the PCB, the LED being disposed to emit light through the third through hole; the third through hole may communicate with the first through hole and the second through hole; and the PCB may be provided at a surface of the display unit facing the frame display. The display unit further may include a diffusion plate disposed between the reflector and the PCB, and a size of the third through hole may be less than that of the second through hole at a connection point between the third through hole and the second through hole. The frame display may include a location piece on which the display unit is located, and a bar extending from the location piece, the bar having a step piece; the frame may include an inclined part configured to change a distance between the frame and the front panel; and the communication hole may be spaced apart from a contact portion between the upper cap decoration unit and the front panel.

Further according to this aspect, the first through hole may include a first through part located at a rear of the front panel, the first through part being formed by etching, and a second through part located at a front of the front panel, the second through part being formed by etching; the first through part and the second through part may communicate with each other such that the first through hole is formed through the front panel from the front to the rear of the front panel; and the first through part and the second through part may have different sectional sizes. The touch sensor assembly may include a sensor unit mounted at the front panel, the sensor unit being in direct contact with the front panel, and a case in which the sensor unit is mounted. The cover display may be provided at a surface of the refrigerator door to face the front panel, the cover display having a receiving unit configured to receive the touch sensor assembly, the receiving unit including a depression of a predetermined depth; and the receiving unit may include an elastic member configured to elastically support the sensor unit such that the sensor unit is pressed against the front panel by the elastic member. The sensor unit may include a plurality of push parts each configured to generate a signal based on being pushed, and the display assembly may include a controller configured to determine, based on two or more of the push parts being simultaneously pushed to generate signals, that the push parts have not been intentionally pushed. The sensor unit may include a plurality of push parts each configured to generate a signal based on being pushed, and the display assembly may include a controller configured to selectively determine, based on one of the push parts generating a signal having a magnitude greater than that of a signal generated by another of the push parts, that at least one of the push parts has been unintentionally pushed.

According to another aspect, a manufacturing method of a refrigerator door includes mounting, at a front panel, a cover display and a touch sensor assembly, mounting, at the front panel, a frame configured to receive the cover display and the touch sensor assembly, mounting, at the front panel, an upper cap decoration unit and a door liner, filling a space defined by the front panel, the door liner, and the upper cap decoration unit with a foam liquid and foaming the foam liquid, and mounting, at the cover display, a frame display having a display unit fixed to the frame display.

Implementations according to this aspect may include one or more of the following features. For example, the method may further include slidably coupling the frame display to the cover display through a communication hole included at the upper cap decoration unit. The method may further include electrically connecting the display unit and the touch sensor assembly to each other via an electric wire after the foaming step. The method may further include performing a primary etching step on a rear of the front panel, and performing a secondary etching step on a front of the front panel before the step of mounting the cover display and the touch sensor assembly at the front panel, wherein the secondary etching step may be carried out after the primary etching step. The primary etching step may include forming a first through part, and the secondary etching step may include forming a second through part such that a portion of the second through part disposed at the front of the front panel has a larger section than the first through part.

According to yet another aspect, a refrigerator door includes a front panel made of a steel material, the front panel being provided at a front of the refrigerator door and forming a front appearance of the refrigerator door, the front panel including a first through hole and an input unit, a door liner forming a rear appearance of the refrigerator door, an upper cap decoration unit configured to seal an upper side of a first space defined between the front panel and the door liner, a frame attached to an inside of the front panel and defining a second space that is separated from the first space defined by the front panel, the door liner, and the upper cap decoration unit, a display assembly provided between the frame and the front panel and configured to emit light through the first through hole, a touch sensor assembly provided between the frame and the front panel, the touch sensor assembly being fixed to a rear of the front panel at a position that corresponds to a location of the input unit, and a diffusion plate provided between the inside of the front panel and the display assembly and configured to diffuse light, the diffusion plate being in contact with one side of the first through hole.

Implementations according to this aspect may include one or more of the following features. For example, the front panel may include a plurality of first through holes, and the diffusion plate may be attached to the front panel such that it covers one side of each of the plurality of first through holes.

It is to be understood that both the foregoing general description and the following detailed description of the present application are exemplary and explanatory and are intended to provide further explanation of the application as claimed.

DETAILED DESCRIPTION

Reference will now be made in detail to the preferred implementations of the present application, examples of which are illustrated in the accompanying drawings. Wherever possible, the same reference numbers will be used throughout the drawings to refer to the same or like parts.

The present application is applicable to a top mount type refrigerator, in which a freezer compartment as a storage compartment for storing foods is disposed above a refrigerator compartment as another storage compartment for storing foods, and a bottom freezer type refrigerator, in which the freezer compartment is disposed under the refrigerator compartment. Of course, the present application is also applicable to a side by side type refrigerator, in which the freezer compartment is disposed at the left side of the refrigerator and the refrigerator compartment is disposed at the right side of the refrigerator.

Hereinafter, a description will be given of a refrigerator including an upper storage compartment and a lower storage compartment, which are partitioned from each other, each of the storage compartment having two doors.

Figure 1:
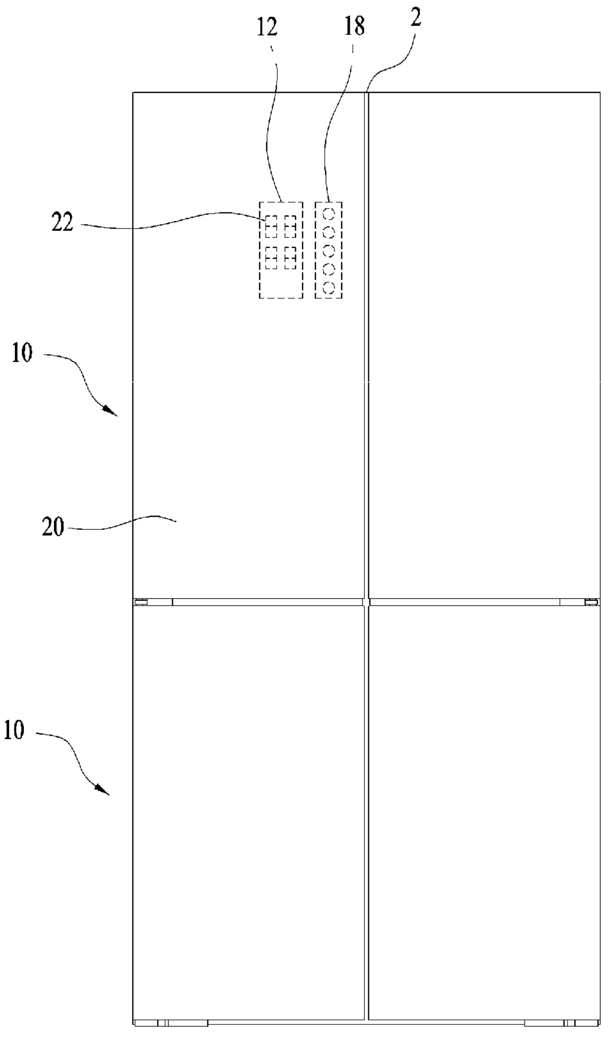
FIG. 1 is a front view of an example refrigerator according to the present application.

Referring to FIG. 1, the refrigerator according to the present application includes a cabinet 2 having a storage compartment constituted by a freezer compartment or a refrigerator compartment and a machinery compartment in which a refrigeration cycle device, such as a compressor, for compressing a refrigerant, is mounted.

At the front of the cabinet 2 are mounted refrigerator doors 10 for opening and closing the storage compartment such that a user can access the storage compartment. The refrigerator doors 10 are hingedly mounted at the cabinet 2 such that the user can turn the refrigerator doors 10.

The refrigerator doors 10 may be mounted at the upper and lower sides of the cabinet 2 such that the refrigerator doors 10 can be turned separately.

The two refrigerator doors 10 may have similar structures and may be disposed in a symmetrical state. However, the two refrigerator doors 10 are different from each other in that the refrigerator doors 10 are turned in opposite directions.

A front panel 20 is disposed at each refrigerator door 10. The front panel 20 forms the front appearance of each refrigerator door 10. When the user is in front of the cabinet 2, the user may look at the refrigerator doors 10.

The front panel 20 may be made of a steel material. The front panel 20 may be made of a stainless steel (STS) material to provide an aesthetically pleasing appearance to the user. No component may be coupled to the front of the front panel 20. As a result, the front panel 20 can form a single surface to provide a neat appearance to the user.

The front panel 20 is provided with a display unit 12 for providing information regarding the refrigerator to the user. The display unit 12 may not be a component attached to the front of the front panel 20 but may be a portion at which a plurality of first through holes 22 extending through the front panel 20 is provided.

That is, a device for emitting light through the first through holes 22 may be provided at the rear of the front panel 20, i.e. in an internal space of the refrigerator door 10, to display numbers or symbols using light emitted through the first through holes 22. The light emitted from the device is provided to the user through the first through holes 22 such that the user can obtain information regarding the refrigerator through the display unit 12.

Each of the first through holes 22 may have a small size such that the user cannot visually recognize the first through holes 22 when the user looks at the refrigerator door 10.

The front panel 20 may be provided with an input unit 18 for allowing the user to input a command. The input unit 18 may not be a component attached to the front of the front panel 20 but may be a portion of the front panel 20.

At the input unit 18 may be formed various symbols, such as a circle, by printing or etching such that the user can push a specific portion of the input unit 18. That is, the user may push a specific portion of the input unit 18 to input a desired command to the refrigerator. Instead of or in addition to the symbols, text or the like, from which the user can understand the meaning of a command, may be formed at the input unit 19.

When the user pushes a portion of the front panel 20 corresponding to the input unit 18, a corresponding command may be input to an input device disposed at the rear of the front panel 20. The user may push the front panel 20, which is made of a steel material, to input a signal to the refrigerator.

The display unit 12 and the input unit 18 may not be additional components exposed from the front panel 20 but may be specific portions of the front panel 20. When not in use, therefore, the display unit 12 and the input unit 18 may not be exposed.

Figure 2:
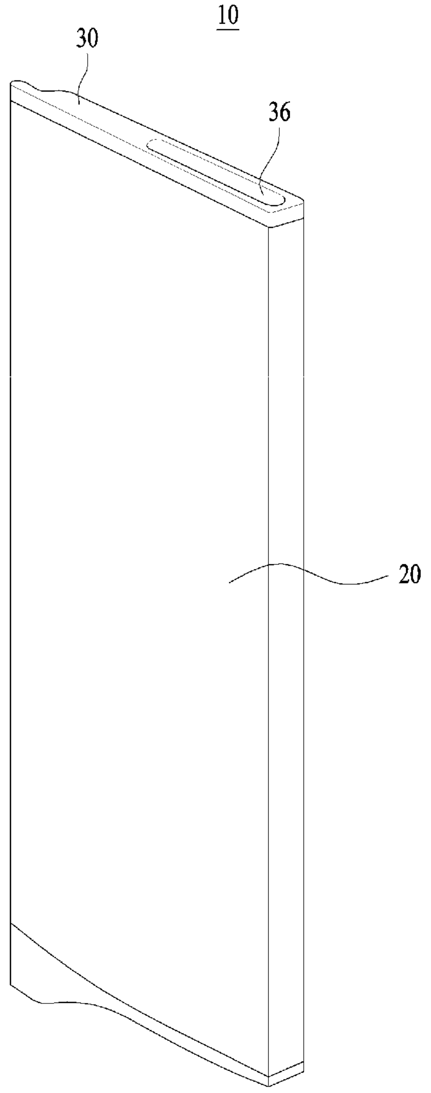
FIG. 2 is a perspective view showing a refrigerator door according to the present application.
Figure 3:
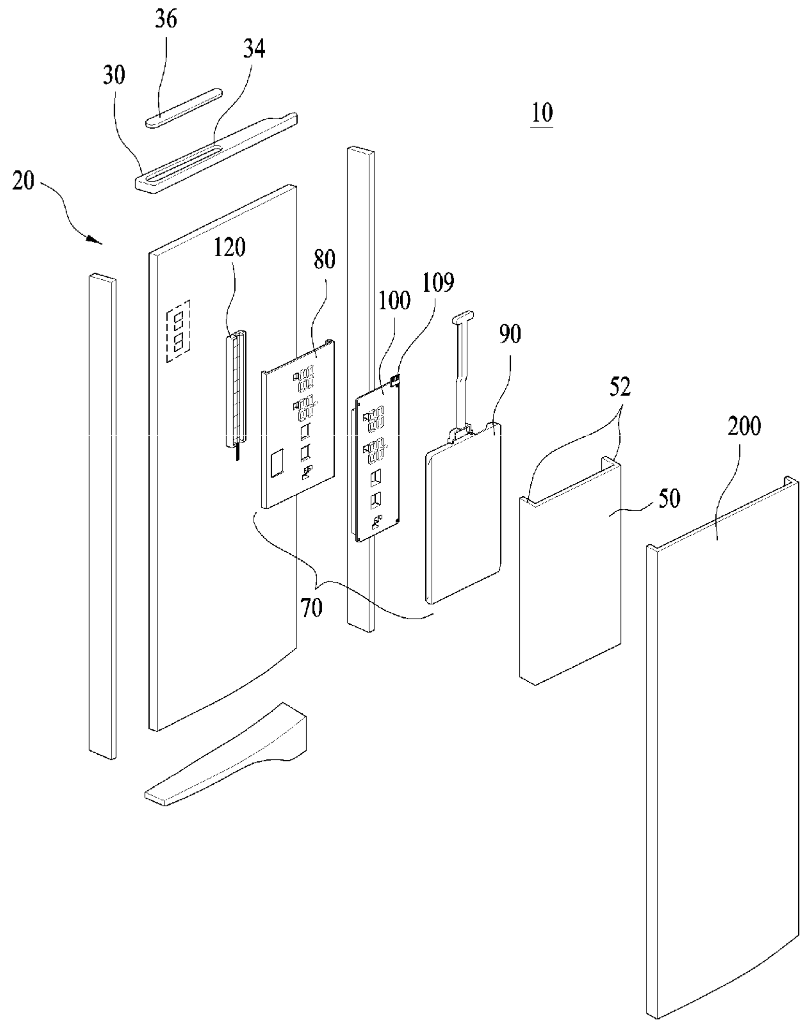
FIG. 3 is an exploded perspective view showing a principal part of the refrigerator door shown in FIG. 2.

Referring now to FIGS. 2 and 3, the refrigerator door 10 may include a front panel 20 forming the front appearance thereof, a door liner 200 forming the rear appearance thereof, and upper and lower cap decoration units 30 for sealing upper and lower spaces defined between the front panel 20 and the door liner 200.

A space defined by the front panel 20, the door liner 200, and the upper and lower cap decoration units 30 may be filled with a foam liquid, which is heated to form a heat insulating material. The storage compartment is disposed at the rear of the door liner 200 with the result that the temperature of the door liner 200 is relatively low. On the other hand, the front panel 20 is exposed outward with the result that the temperature of the front panel 20 is relatively high. For this reason, a heat insulating material may be disposed in the refrigerator door 10.

In the space defined by the front panel 20, the door liner 200, and the upper and lower cap decoration units 30 may be provided a frame 50, which is disposed at the inside of the front panel 20. One major surface of the frame 50 may be disposed at the front panel 20 and the upper end of the frame 50 may be covered by the upper cap decoration unit 30 to form a space in which no foam liquid is filled. That is, a space defined by the front panel 20 and the frame 50 forms an empty space in which no foam liquid is filled.

In the space defined by the frame 50 and the front panel 20 may be provided a display assembly 70 and a touch sensor assembly 120.

The display assembly 70 and the touch sensor assembly 120 may be fixed to the front panel 20 such that one major surface of the display assembly 70 and one major surface of the touch sensor assembly 120 can be attached to the inside of the front panel 20.

The upper cap decoration unit 30 may be provided with a communication hole 34, through which the space defined by the frame 50 and the front panel 20 can communicate with the outside of the refrigerator door 10. Through the communication hole 34, some components of the display assembly 70 may be inserted into the space defined by the frame 50 and the front panel 20.

The communication hole 34 may not be formed at a portion of the upper cap decoration unit 30 contacting the front panel 20 but may be formed at a middle portion of the upper cap decoration unit 30. The upper cap decoration unit 30 may be coupled to the front panel 20 at the upper outer circumference of the front panel 20. In some cases, the communication hole 34 may be formed at a portion of the upper cap decoration unit 30 apart from the contact portion between the upper cap decoration unit 30 and the front panel 20, i.e. a middle portion of the upper cap decoration unit 30 apart from the outer circumference of the upper cap decoration unit 30. When the upper cap decoration unit 30 is coupled to the front panel 20, therefore, the contact portion between the upper cap decoration unit 30 and the front panel 20 may be sufficiently secured, and therefore the upper cap decoration unit 30 may be stably coupled to the front panel 20.

The upper cap decoration unit 30 may further include a cap cover 36 for sealing the communication hole 34. After components are inserted into the space defined between the frame 50 and the front panel 20, the cap cover 36 may seal the communication hole 34.

The display assembly 70 and the touch sensor assembly 120 may be disposed at the rear of the front panel 20 in tight contact.

The frame 50 may be provided with opposite side walls 52 such that the frame 50 can have a bracket shape when viewed from above. Opposite sides of the display assembly 70 may contact the opposite side walls 52 such that the display assembly 70 can be fixed to the frame 50.

The frame 50 may form an isolated space in which the display assembly 70 and the touch sensor assembly 120 contact no foam liquid. The display assembly 70 and the touch sensor assembly 120 each include a device using electricity. If the display assembly 70 and the touch sensor assembly 120 contact the foam liquid, therefore, serious problems may occur. For this reason, the inner space of the frame 50 may be sealed such that the foam liquid cannot be introduced into the inner space of the frame 50.

The opposite side walls 52 of the frame 50 each may have a predetermined area such that the frame 50 can be securely fixed to the front panel while having a predetermined contact area.

In the space defined by the frame 50 and the front panel 20 may be disposed the display assembly 70 and the touch sensor assembly 120 in a state in which the display assembly 70 and the touch sensor assembly 120 are coupled to each other. The display assembly 70 and the touch sensor assembly 120 may be connected to each other via an electric wire.

Information provided from the display assembly 70, i.e. light emitted from the display assembly 70, may be provided to the user through the display unit 12 previously described with reference to FIG. 1. In addition, a command input by the user through the input unit 18 may be input to the touch sensor assembly 120. The command input to the touch sensor assembly 120 may be displayed through the display assembly 70 such that information indicating that the command has been input can be provided to the user.

Figure 4:
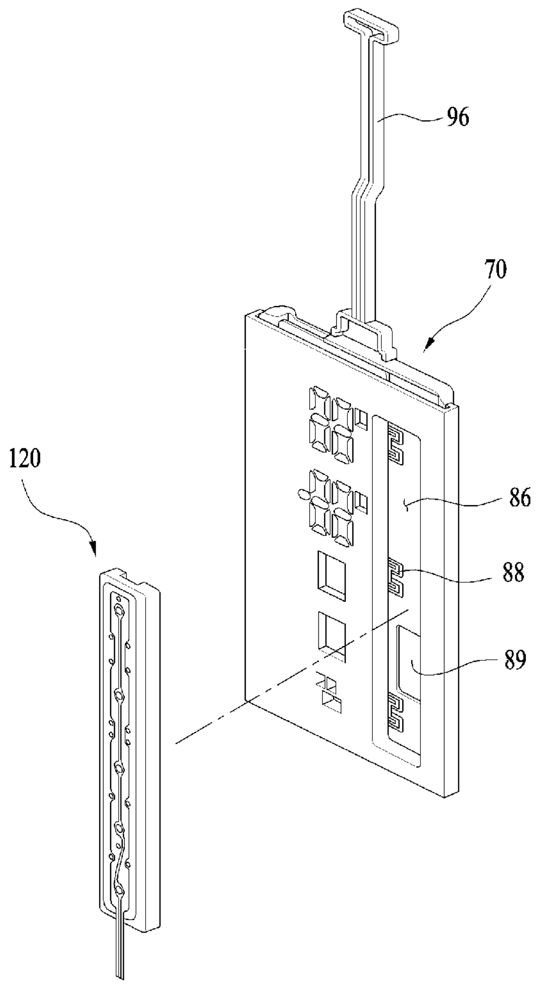
FIG. 4 is a perspective view showing a touch sensor assembly and a display assembly.

FIG. 4 shows the touch sensor assembly and the display assembly. The touch sensor assembly and the display assembly are shown separated from each other for clarity.

The display assembly 70 may have a receiving unit 86 depressed to a predetermined depth. The touch sensor assembly 120 may be received in the receiving unit 86. The receiving unit 86 may be disposed at one main surface of the display assembly 70 facing the front panel 20 such that one major surface of the touch sensor assembly 120 can contact the front panel 20 in a state in which the touch sensor assembly 120 is received in the receiving unit 86.

The front of the display assembly 70 may be fixed to the inside of the front panel 20 using an adhesive member. On the other hand, the touch sensor assembly 120 may be coupled in the receiving unit 86 of the display assembly 70 in a state in which the touch sensor assembly 120 is directly in tight contact with the inside of the front panel 20 such that when the front panel is pushed at the outside thereof, the push force can be directly transmitted to the touch sensor assembly 120.

The receiving unit 86 may be provided with an elastic member 88 for elastically supporting the touch sensor assembly 120 in a direction opposite to the front panel 20, i.e. the receiving unit 86. The elastic member 88 may be a spring, which may have various shapes. In the figure, the elastic member 88 is shown as formed by cutting one major surface of the receiving unit 86 in a bent shape. The elastic member 88 may be formed by cutting one major surface of the receiving unit 86 such that a long extension bar is bent in various directions to provide elastic force.

When the user pushes the front panel 20, therefore, the elastic member 88 may be pushed backward to prevent excessive pressure from being applied to the touch sensor assembly 120.

When the user removes the force applied to the front panel, the touch sensor assembly 120 may move to the original position thereof such that the pressure applied to the input unit 18 can be transmitted to the touch sensor assembly 120.

At the receiving unit 86 may be formed a through hole 89, through which the electric wire provided at the touch sensor assembly 120 can extend. The touch sensor assembly 120 and the display assembly 70 may be connected to each other via the electric wire. The through hole 89 is disposed at the receiving unit 86, in which the touch sensor assembly 120 is mounted. Consequently, it is possible to prevent the increase in length of the electric wire.

The touch sensor assembly 120 may be disposed at a portion of the front panel 20 at which when the user pushes the front panel 20, the pressure can be transmitted to the touch sensor assembly 120. When the user pushes the front panel 20, the pressure may be transmitted to the touch sensor assembly 120. Consequently, the user may input a desired command.

Figure 5:
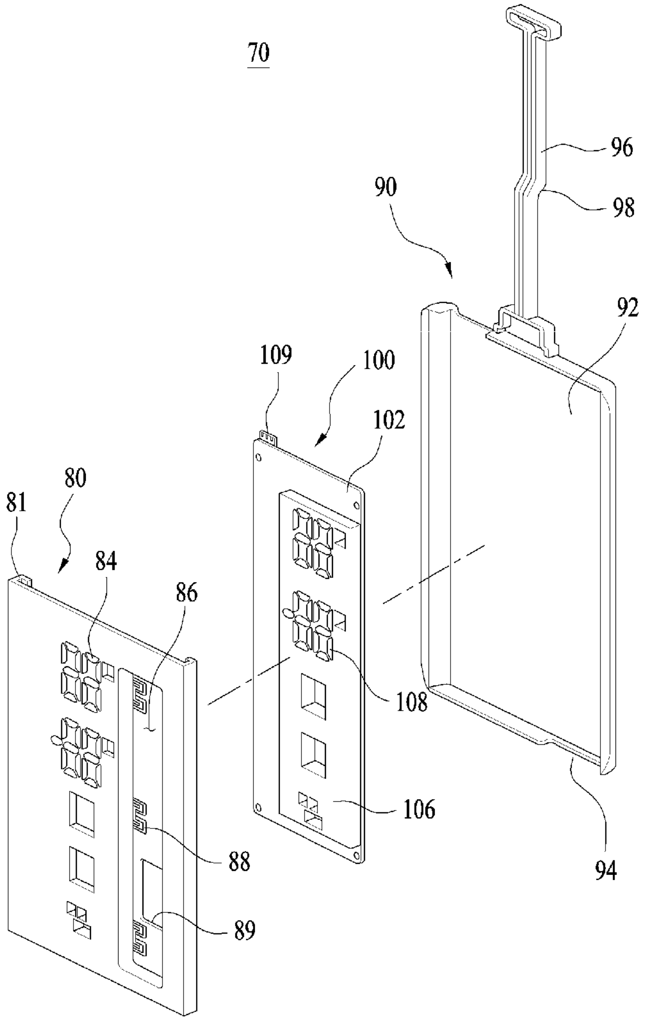
FIG. 5 is an exploded perspective view of the display assembly shown in FIG. 4.

Referring to FIG. 5, the display assembly 70 may include a cover display 80 mounted at the front panel 20, a frame display 90 slidably coupled to the cover display 80, and a display unit 100 coupled to the frame display 90.

The display unit 100 and the frame display 90 may be coupled to the cover display 80 in a state in which the cover display 80 is mounted at the front panel 20. Accordingly, the display assembly 70 may be assembled in this manner.

The cover display 80 may be fixed to the front panel 20 using an adhesive member. For example, the adhesive member may be a double-sided adhesive tape.

At the cover display 80 may be formed second through holes 84, through which light emitted from the display unit 100 passes. The second through holes 84 formed at the cover display 80 may have various shapes such that light emitted from the display unit 100 displaying numbers or symbols can pass through the second through holes 84.

The cover display 80 may be provided at opposite ends thereof with guide rails 81 into which the frame display 90 is inserted and fixed. Each of the guide rails 81 has a bracket shape. Consequently, opposite ends of the frame display 90 may be inserted into the guide rails 81 such that the cover display 80 and the frame display 90 can be coupled to each other.

The frame display 90 may include a location piece 92, on which the display unit 100 is located, and a bar 96 extending upward from the location piece 92. The location piece 92 is generally formed in a plate shape such that the display unit 100 can be disposed at one major surface of the location piece 92.

The location piece 92 may be fixed to the guide rails 81 of the cover display 80. The bar 96 may extend upward from the location piece 92 such that the location piece 92 can be inserted into the cover display 80. That is, when the frame display 90 is moved through the communication hole 34 formed at the upper cap decoration unit 30, the bar 96 may guide the movement of the frame display 90. Meanwhile, the end of the bar 96 may be coupled to the cap cover 36 such that the frame display 90 can retain stable coupling force in a state in which assembly of the frame display 90 is completed.

At the bar 96 may be formed a step piece 98 extending in a step shape. The communication hole 34 is located at the middle of the upper cap decoration unit 30, and the display assembly 70 is disposed at the front panel 20 in contact. As a result, the position of the display assembly 70, specifically the frame display 90, relative to the front panel 20 when the frame display 90 passes through the communication hole 34 is different from that of the frame display 90 relative to the front panel when the frame display 90 is coupled to the cover display 80. For this reason, the step piece 98 is provided such that the position of the frame display 90 can be changed by the step piece 98 when the frame display 90 is coupled to the cover display 80.

The display unit 100 may include a reflector 106 having third through holes 108 and a printed circuit board (PCB) 102 coupled to the reflector 106. The PCB 102 may be provided at one main surface of the display unit 100 facing the frame display 90.

At the PCB 102 may be provided an electric wire connector 109, which is connected to an electric wire connected to an external power source. The electric wire connector 109 may be formed at the rear of the PCB 102, i.e. one main surface of the PCB 102 opposite to the other main surface at which the reflector 106 is located.

In the present example, the front panel 20 is shown made of a steel material, and a touch sensor for generating an electric signal when pushed is mounted at the inside of the front panel 20. When the refrigerator door 10 is grounded, therefore, static electricity flows to the touch sensor with the result that the touch sensor may malfunction. When the refrigerator door 10 is grounded, on the other hand, static electricity may be generated in the refrigerator door 10 with the result that electronic components mounted in the refrigerator door 10 may be damaged or malfunction due to the static electricity. In particular, the electric wire connector 109, which is a component in which electricity flows, may be easily damaged due to the static electricity generated in the refrigerator door 10. For this reason, it is necessary to dispose the electric wire connector 109 as far from the front panel 20 as possible. In the present application, therefore, the electric wire connector 109 is not disposed at the front of the PCB 102 but is disposed at the rear of the PCB 102 such that the electric wire connector 109 is far from the front panel 20.

At the PCB 102 is disposed a light emitting diode (LED) for emitting light. The LED may be disposed at one main surface of the PCB 102 opposite to the other main surface at which the electric wire connector 109 is located, i.e. the front of the PCB 102.

The reflector 106 may be generally made of a plastic material. The reflector 106 may guide light emitted from the PCB 102 and prevent the PCB 102 from being exposed outward when assembled.

The light emitted from the PCB 102 may pass through the third through holes 108. The LED for emitting light to provide information to the user may be mounted at the PCB 102. The light emitted from the PCB 102 may be transmitted to the user via the third through holes 108 formed at the reflector 106, the second through holes 84 formed at the cover display 80, and the first through holes 22 formed at the front panel 20.

Before the frame display 90 is coupled to the cover display 80, the display unit 100 may be coupled to the frame display 90. In this way, the display unit 100 and the frame display 90 may be simultaneously coupled to the cover display 80. Consequently, the display assembly 70 may be easily and conveniently assembled.

Meanwhile, the frame display 90 and the display unit 100 are slidably coupled to the cover display 80 in a state in which the frame display 90 and the display unit 100 are coupled to each other. During sliding, therefore, the PCB 102 of the display unit 100 may be damaged.

For this reason, the reflector 106 may be disposed at one major surface of the display unit 100 at which friction occurs between the display unit 100 and the cover display 80 when the display unit 100 is mounted at the cover display 80, and the PCB 102 may be disposed at the other main surface of the display unit 100 opposite to the surface at which the reflector 106 is disposed such that damage to the PCB 102 can be prevented.

At the edge of the location piece 92 may be formed a wall for protecting the edge of the PCB 102. This is because the PCB 102, which is an electric component, may be easily damaged due to static electricity or even a small impact.

In some cases, the location piece 92 may be provided at the lower edge thereof with a guide groove 94, having a shape corresponding to that of the receiving unit 86, for guiding the receiving unit 86 when the frame display 90 is inserted into the cover display 80. The frame display 90 is moved downward and then coupled to cover display 80. The receiving unit 86 for receiving the touch sensor assembly 120 is formed at the cover display 80 such that the receiving unit 86 protrudes backward. As a result, interference may occur between the receiving unit 86 and the frame display 90. For this reason, the guide groove 94 may be provided to prevent the occurrence of interference between the cover display 80 and the frame display 90 during assembly of the cover display 80 and the frame display 90

Figure 6:
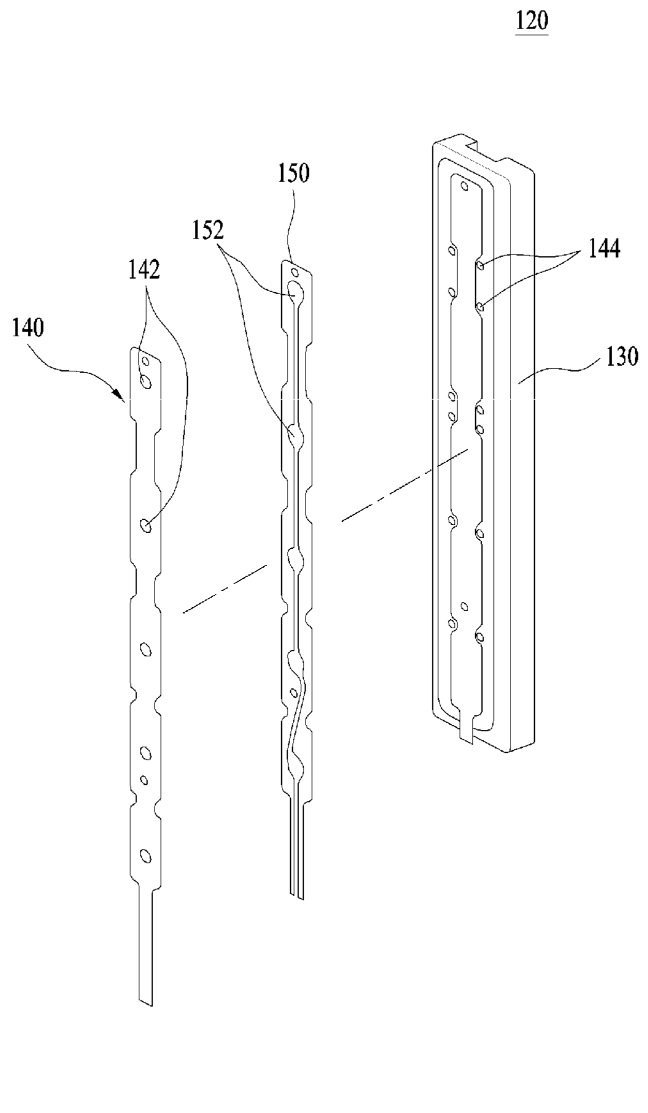
FIG. 6 is an exploded perspective view of the touch sensor assembly shown in FIG. 4.
Figure 7:
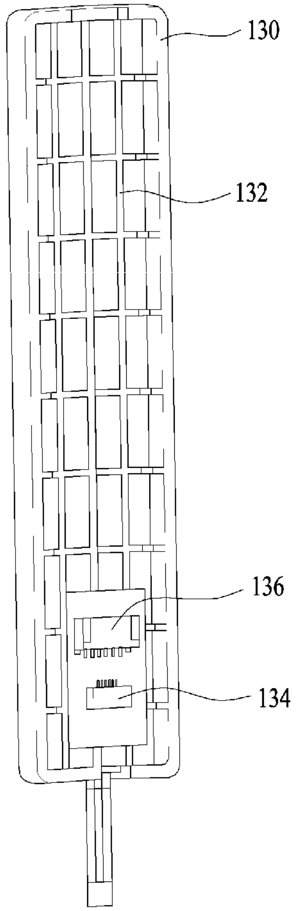
FIG. 7 is a view showing the rear of a case of the touch sensor assembly shown in FIG. 6.

Referring further to FIGS. 6 and 7, the touch sensor assembly 120 may include a sensor unit 140 mounted at the front panel 20 in contact and a case 130 in which the sensor unit 140 is disposed. The sensor unit 140 may be fixed to the case 130 using an adhesive member 150.

The sensor unit 140 may include at least one push part 142 for receiving a corresponding signal when the user pushes the input unit 18. The user may push a portion of the front panel 20 at which the push part 142 is located to input a desired command. A plurality of push parts 142 may be provided such that the user can input different commands when the user pushes the push parts located at different positions of the sensor unit 140.

In some cases, the adhesive member 150 may be provided with guide holes 152, through which the sensor unit 140, specifically the push parts 142, can move when the push parts 142 are pushed. The guide holes 152 may be formed at positions corresponding to the push parts 142 such that the push parts 142 can move through the guide holes 152 when the push parts 142 are pushed. Accordingly, the number of the guide holes 152 may be equal to that of the push parts 142, and the guide holes 152 may be formed at positions corresponding to the push parts 142.

The sensor unit 140 is disposed in the case 130 in a state in which the sensor unit 140 may be fixed to the case 130 using the adhesive member 150.

The case 130 may be provided with a support part 144 for supporting the front panel 20 when the user pushes a position between every two push parts 142 to prevent the push parts 142 from being pushed. That is, when the user pushes a portion of the front panel 20 other than a position of the front panel 20 corresponding to each push part 142 to input a specific command, the support part 144 may support the front panel 20 such that the push part 142 cannot be pushed. The support part 144 will hereinafter be described in detail with reference to FIG. 13.

The sensor unit 140 may be a capacitance type sensor unit or a resistance cell type sensor unit, among others.

The capacitance type sensor unit senses the change in distance of an air layer at each push part 142 as capacitance. The capacitance type sensor unit has an advantage in that circuitry is simply configured with low cost.

On the other hand, the resistance cell type sensor unit uses the change of a resistance value generated when pressure applied to each push part 142 is changed. The resistance cell type sensor unit has an advantage in that circuitry is simply configured with low cost.

In some cases, the sensor unit 140 may be a piezo type sensor unit, a detailed description of which will be omitted.

A latticed rib 132 may be formed at the rear of the case 130. The rib 132 can increase the strength of the case 130 while reducing load of the case 130.

The rear of the case 130 may be supported by the receiving unit 86 of the cover display 80. Specifically, the elastic member 88 may elastically support the rear of the case 130.

The case 130 may be provided with a sensor unit terminal 134, to which an electric wire extending from the sensor unit 140 is connected. Accordingly, although the sensor unit 140 is mounted at the front of the case 130, the electric wire extending from the sensor unit 140 may be coupled to the sensor unit terminal 134 disposed at the rear of the case 130.

The case 130 may be provided at the rear thereof with a PCB connection terminal 136, to which an electric wire extending from the PCB 102 of the display unit 100 is connected. The electric wire connected to the electric wire connector 109 of the PCB 102 may also be connected to the PCB connection terminal 136. Alternatively, the electric wire connected to the electric wire connector 109 of the PCB 102 may be connected to a central controller of the refrigerator or an external power source. Consequently, the electric wire connected to the PCB connection terminal 136 may be connected to the PCB 102 via a connector other than the electric wire connector 109 of the PCB 102.

The PCB 102 and the sensor unit 140 may be electrically connected to each other at the rear of the case 130. Since the electric wire can extend through the through hole 89 formed at the cover display 80, it is possible to provide a physical space in which the sensor unit 140 and the PCB 102 can be electrically connected to each other.

Figure 8:
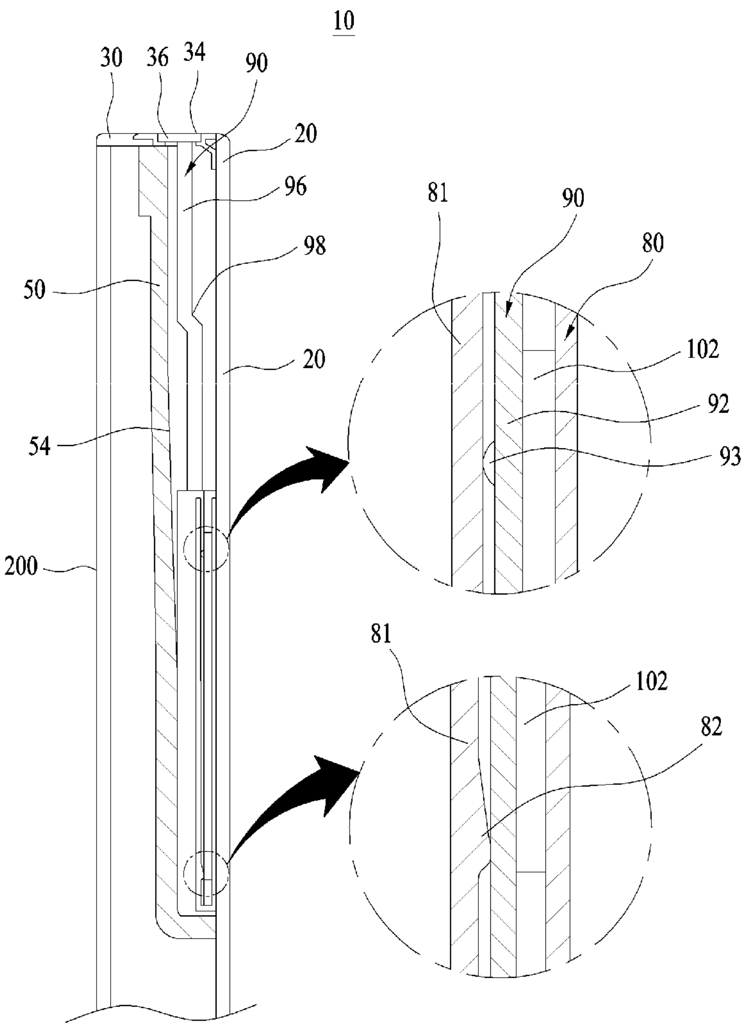
FIG. 8 is a side sectional view of the refrigerator door.
Figure 9:
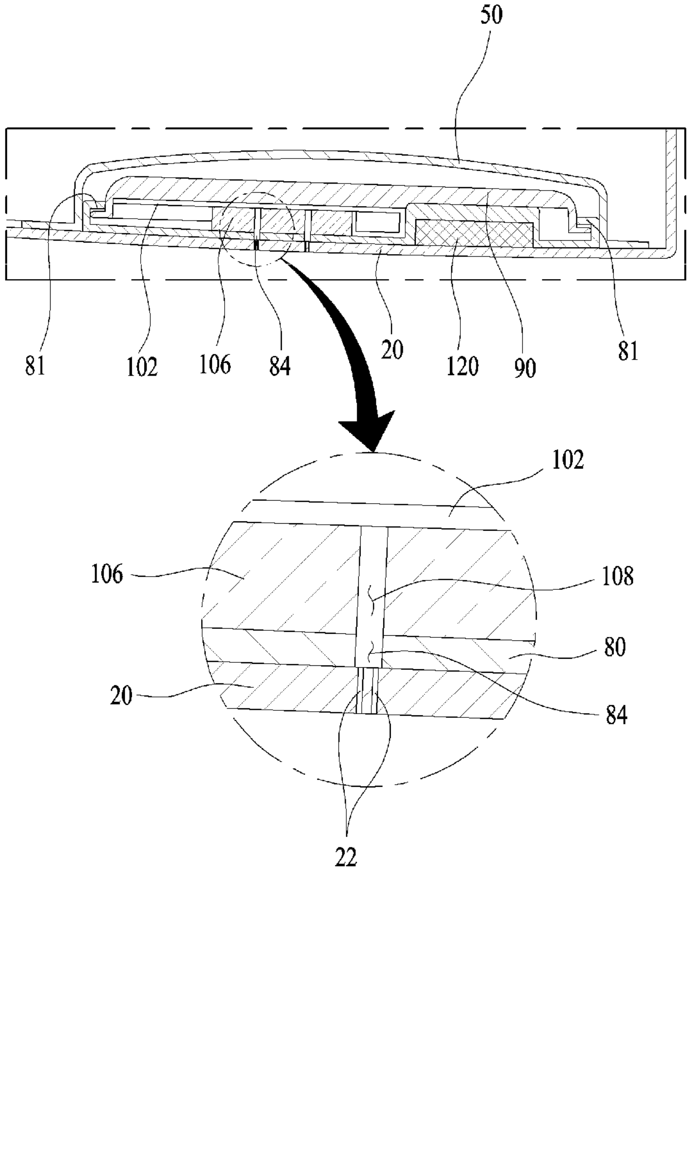
FIG. 9 is a sectional view of the refrigerator door when viewed from above.

FIGS. 8 and 9 show a state in which the display assembly 70 and the touch sensor assembly 120 are mounted at the refrigerator door 10.

Referring to FIGS. 8 and 9, guide member 82 is provided at each of the guide rails 81 of the cover display 80 in a state in which the guide member 82 protrude from each of the guide rails 81 of the cover display 80. When the frame display 90 is moved downward in a state in which the opposite ends of the frame display 90 are disposed in the guide rails 81, therefore, the guide rails 81 may provide spaces defined between the guide rails 81 and the frame display 90 such that the frame display 90 can be easily moved. Since one major surface of the frame display 90 is supported by the guide member 82, however, the position of the frame display 90 may be fixed. At this time, the guide member may guide the display unit 100 such that the display unit 100 can be moved toward the cover display 80. This is because light emitted from the PCB 102 can be transmitted to the user through the front panel 20 only when the display unit 100 is disposed at the cover display 80 in tight contact.

A protrusion 93 may be formed at the location piece 92. The protrusion 93 may generally have a hemispherical shape such that the frame display 90 can be coupled in the guide rails 81 in a fixed state.

When the opposite ends of the frame display 90 pass along the guide rails 81, it may be necessary to provide spaces between the frame display 90 and the guide rails 81 for easy coupling. However, after assembly of the cover display 80 and the frame display 90 is completed, it may be necessary to fix the cover display 80 and the frame display 90 such that the cover display 80 and the frame display 90 cannot move relative to each other.

Therefore, each of the guide rails 81 may have a gap greater than the thickness of each end of the frame display 90 in addition to the provision of the protrusion 93 or the guide member 82 to secure a fixing force between the frame display 90 and the cover display 80.

A plurality of guide members 82 may be provided. In addition, a plurality of protrusions 93 may be provided. The guide members and the protrusions 93 may be formed at both the cover display 80 and the frame display 90.

The frame 50 may be provided with an inclined part 54 for changing the distance between the frame 50 and the front panel 20. That is, the distance between the frame 50 and the front panel 20 may be smaller at the lower side of the front panel 20 than at the upper side of the front panel 20.

After the frame 50 is coupled to the front panel 20, the frame display 90 is coupled between the frame 50 and the front panel 20. For this reason, it may be necessary to secure a sufficient insertion space for easy assembly when the frame display 90 is initially inserted through the communication hole 34.

The step piece 98 can be formed at the bar 96. Consequently, the frame display 90 may be moved such that the frame display 90 is more adjacent to the front panel 20 when the frame display 90 is finally coupled to the front panel 20 after passing through the communication hole 34 than when the frame display 90 passes through the communication hole 34.

As shown in FIG. 9, the cover display 80, the reflector 106, the PCB 102, and the frame display 90 are disposed at the front panel 20 in tight contact. As shown, the opposite ends of the rear of the frame display 90 are supported by the guide rails 81 provided at the cover display 80 to maintain coupling between the cover display 80 and the frame display 90.

The touch sensor assembly 120 may be disposed at one major surface of the cover display 80 in a state in which the touch sensor assembly 120 is received in the receiving unit 86. Since one major surface of the touch sensor assembly 120 is supported by the receiving unit 86, the other major surface of the touch sensor assembly 120 may be disposed at the front panel 20 in tight contact.

As such, light emitted from the LED of the PCB 102 may be transmitted to the user via the third through holes 108, the second through holes 84, and the first through holes 22 in order. That is, the third through holes 108, the second through holes 84, and the first through holes 22 communicate with one another although the third through holes 108, the second through holes 84, and the first through holes 22 have different sizes. Consequently, the light may move straight to the front of the front panel.

The etching process according to the present application will be described with reference to FIG. 10.

Figure 10:
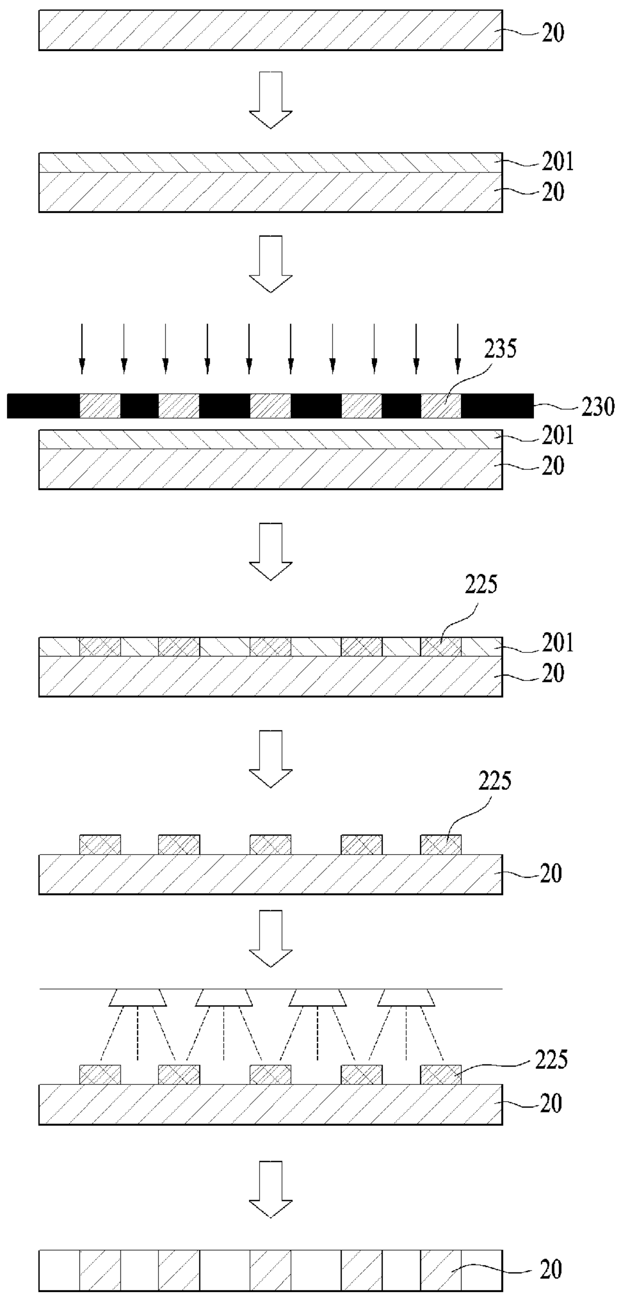
FIG. 10 schematically illustrates an etching process according to the present application.

FIG. 10 shows a general etching process, which is well-known by those skilled in the art to which the present application pertains and thus a detailed description of which will be omitted.

First, a front panel 20 made of a steel material is prepared, and then a film 201, at which a pattern will be formed, is laminated on one major surface of the front panel 20. The film 201 may be a photosensitive dry film.

An output film 230 having a pattern 235 for transmitting ultraviolet light is disposed on the dry film 201, and ultraviolet light is emitted to the dry film 201 through the pattern 235 of the output film 230. As a result, a portion of the dry film 201, to which the ultraviolet light has been emitted, is hardened.

As shown in FIG. 10, the output film 230 is spaced apart from the dry film 201 by a predetermined distance. Alternatively, the output film 230 may be disposed at the dry film 201 in contact.

Subsequently, an unexposed portion, i.e. an unhardened portion, of the dry film 201 is removed using a developing solution. As a result, the hardened portion of the dry film 201 is left to form a masking 225, and thus a portion of the front panel 20 corresponding to the pattern is exposed.

Subsequently, an etching solution is sprayed over the surface of the front panel 20 at which the dry film 201 is located to etch the remaining portion of the front panel 20 excluding the portion of the front panel 20 corresponding to the masking 225.

Since the dry film 201 is provided, the size of each hole formed at the etched surface of the front panel 20 may be greater than that of each hole formed at the other surface of the front panel 20 at which the dry film 201 is not provided.

Figure 11A:
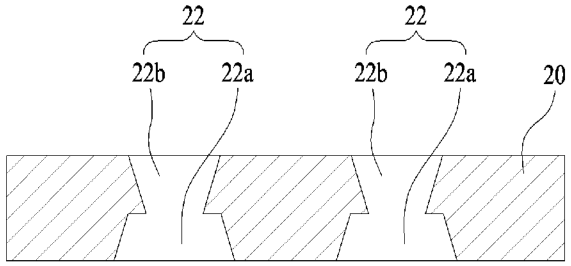
FIGS. 11A and B are side views showing example shapes of through parts according to the present application.
Figure 11B:
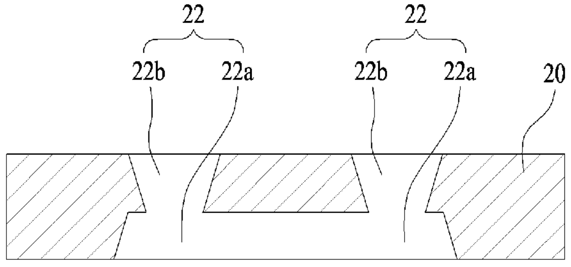

FIGS. 11A and 11B show different implementations of the through parts.

In the present application, the etching process shown in FIG. 10 may be carried out in a state in which dry films are disposed at the front and the rear of the front panel 20.

The diameter of each hole formed at the front panel 20 by etching is generally affected by the thickness of the front panel 20. The diameter of each hole formed at the front panel 20 by etching may be greater than the thickness of the front panel 20.

For example, in a case in which the front panel 20 is manufactured to have a thickness of about 0.5 T such that the front panel 20 exhibits a sufficient strength, the size of each hole formed at the front panel 20 by etching may increase in proportion to the thickness of the front panel 20. Such a technical limitation is commonly observed for etching.

When the size of the holes formed at the front panel 20 increases, however, the user may easily recognize the holes with the result that the front panel 20 may not provide an aesthetically pleasing appearance to the user. In the present application, therefore, the etching process shown in FIG. 10 may be sequentially or simultaneously carried out two times to reduce the size of each hole formed at the front panel 20.

That is, as shown in FIG. 11, a first through hole 22 formed at the front panel 20 may include a first through part 22*a* located at the rear of the front panel 20 and a second through part 22*b* located at the front of the front panel 20. The first through part 22*a* may be a part formed through the rear of the front panel 20, and the second through part 22*b* may be a part formed through the front of the front panel 20.

The first through part 22*a* and the second through part 22*b* communicate with each other such that the hole is formed through the front panel 20 from the front to the rear thereof The first through part 22*a* and the second through part 22*b* have different sectional sizes.

The first through part 22*a* may be formed by etching in a state in which a dry film is disposed at the rear of the front panel 20. That is, the first through part 22*a* may be formed such that a portion of the first through part 22*a* disposed at the rear of the front panel 20 has a relatively large section.

The second through part 22*b* may be formed by etching in a state in which a dry film is disposed at the front of the front panel 20. That is, the second through part 22*b* may be formed such that a portion of the second through part 22*b* disposed at the front of the front panel 20 has a relatively large section.

As shown in FIG. 11A, the first through hole 22 may have one first through part 22*a* and one second through part 22*b* communicating with each other.

As shown in FIG. 11B, on the other hand, the first through hole 22 may have one first through part 22*a* and a plurality of second through parts 22*b* communicating with each other.

The size of the first through part 22*a* is generally greater than that of the second through part 22*b*.

At a primary etching step, the first through part 22*a* is formed. Before etching, the front panel 20 has the original thickness. Consequently, the first through part 22*a* having a relatively large size may be formed by etching.

Subsequently, at a secondary etching step, the second through part 22*b* is formed. Since the primary etching step has been completed, the thickness of a portion of the front panel 20 at which the first through part 22*a* is formed is less than that of the remaining portion of the front panel 20. Since the thickness of the portion of the front panel 20 at which the first through part 22*a* is formed is reduced by etching, the thickness of the portion of the front panel 20 at which the first through part 22*a* is formed is less than that of the remaining portion of the front panel 20. Consequently, the second through part 22*b* having the size less than that of the first through part 22*a* may be formed by etching.

The display assembly 70 and the touch sensor assembly 120 may be disposed at the rear of the front panel 20. Consequently, light introduced into the front panel 20 through the first through part 22*a* having a relatively large size may be provided to the user as an image of the light refined through the second through part 22*b*.

The strength of the front panel 20 at the first through hole 22 shown in FIG. 11A may be greater than that of the front panel 20 at the first through hole 22 shown in FIG. 11B. This is because a portion of the front panel 20 at which the thickness of the front panel 20 is reduced in FIG. 11A is smaller than that of the front panel 20 at which the thickness of the front panel 20 is reduced in FIG. 11B.

As shown in FIG. 11, the first through hole 22 may be formed by etching. Alternatively, the first through hole 22 may be formed by laser machining. In a case in which the first through hole 22 is formed by laser machining, the section of the first through hole 22 may have a uniform size unlike FIG. 11.

Figure 12A:
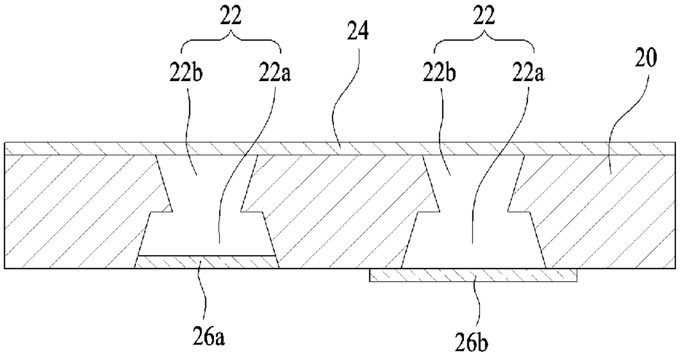
FIGS. 12A-C are side views showing example states in which sealing members are mounted.
Figure 12B:
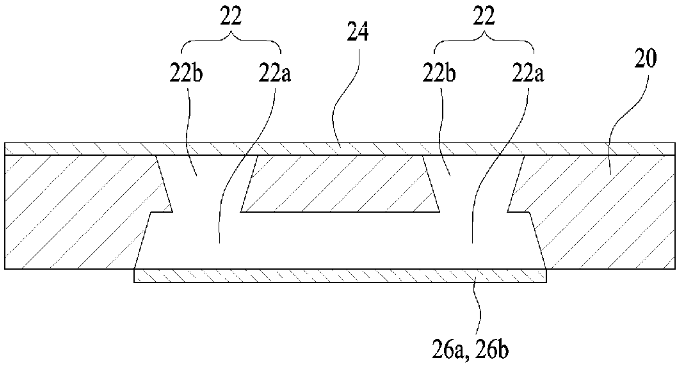
Figure 12C:
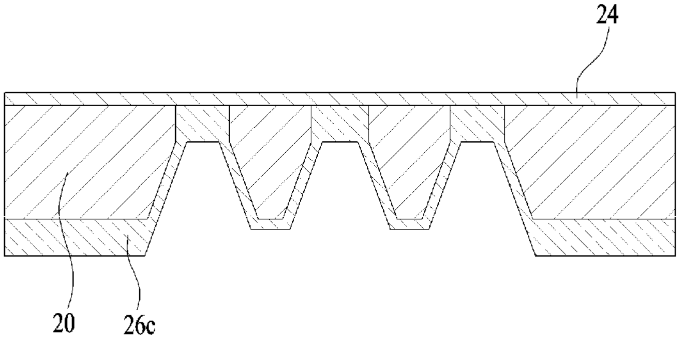

FIG. 12A shows a state in which sealing members are mounted at the structure shown in FIG. 11A, FIG. 12B shows a state in which sealing members are mounted at the structure shown in FIG. 11B, and FIG. 12C shows a state in which other types of sealing members are mounted. Hereinafter, the sealing members will be described with reference to FIGS. 12A-C.

Since the first through hole 22 is an empty space, foreign matter, such as dust, may be introduced into the first through hole 22. If the first through hole 22 is filled with the foreign matter, it is difficult for light emitted from the display assembly 70 to be transmitted to the user through the first through hole 22.

As shown in FIGS. 12A-C, therefore, a first sealing member 24 for sealing the first through hole 22 at the front of the front panel 20 may be provided.

The first sealing member 24 may be made of a material that is capable of preventing a fingerprint of the user from being left thereon. For example, the first sealing member 24 may be made of an anti-fingerprint material such that no fingerprint of the user is left on the front of the front panel 20 when the user touches the front of the front panel 20.

In addition, a second sealing member 26 for sealing the first through hole 22 at the rear of the front panel 20 may be provided. The second sealing member 26 may be a transparent paint or spray 26*a* for sealing the first through hole 22. Alternatively, the second sealing member 26 may be a transparent tape 26*b* for sealing the first through hole 22.

Both the second sealing member 26 and the first sealing member 24 may be made of a transparent material such that light emitted from the display assembly 70 can be transmitted to the user through the first through hole 22.

Since the first sealing member 24 seals the front of the first through hole 22, and the second sealing member 26 seals the rear of the first through hole 22, the first through hole 22 may form a sealed space, a transparent state of which is maintained On the other hand, as shown in FIG. 12C, the first sealing member 24 may be easy clean coated.

As shown in FIG. 12C, the second sealing member 26 may be silk screened urethane 26*c*. When the first through part 22*a* of the first through hole 22 is silk screened, the urethane 26*c* may be applied over the inside of the first through hole 22 and the second through part 22*b* of the first through hole 22.

Since the size of the second through part 22*b* is less than that of the first through part 22*a*, the second through part 22*b* may be silk screened to easily seal the first through hole 22. That is, since the size of the first through part 22*a* is greater than that of the second through part 22*b*, the urethane 26*c* silk screened at the first through part 22*a* may move to the second through part 22*b* along the inside of the first through hole 22.

Figure 13A:
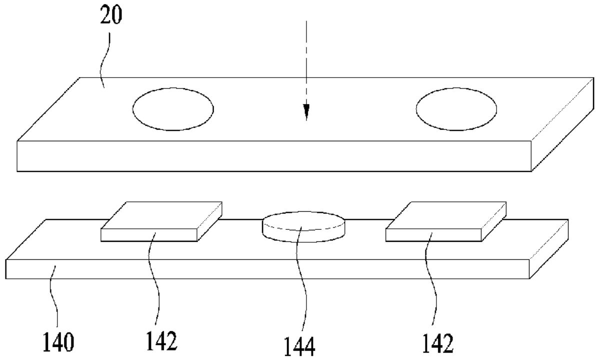
FIGS. 13A-C are conceptual views showing example implementations of a sensor unit applicable to the present application.
Figure 13B:
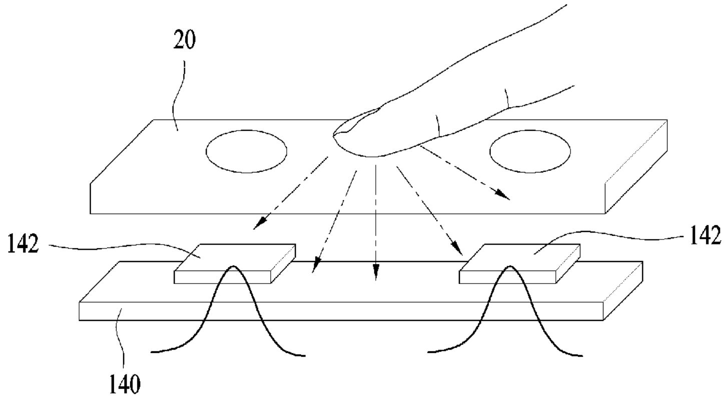
Figure 13C:
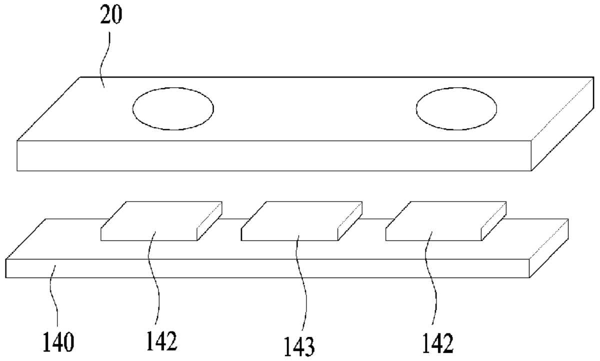

FIGS. 13A-C illustrate example methods of preventing input of an incorrect command when the user does not push a specific one of the push parts but pushes an incorrect position, i.e. a position between push parts.

As shown, the front panel 20 is made of a steel material. When the user pushes a specific one of the push parts 142, therefore, other push parts 142 disposed at opposite sides of the pushed one 142 may also be pushed to some extent. This is because the steel is a single strong body, and when a specific portion of the steel is pushed, another portion of the steel around the pushed portion is also deformed with the result that the push force may be transmitted to the portion of the steel around the pushed portion. FIGS. 13A-C show example methods of solving such a technical limitation.

FIG. 13A shows a method of arranging a support part 144 between two push parts. The sensor unit 140 includes a plurality of push parts 142 (two push parts 142 being shown in the figure). When the user pushes a portion of the front panel 20 corresponding to a specific one of the push parts 142, the push part 142 is pushed to input a command.

At this time, the user may incorrectly push a portion of the front panel 20 between the two push parts 142 with the result that the two push parts 142 may be pushed simultaneously.

In order to prevent the occurrence of such an error, the support part 144 may be provided between the two push parts 142 to prevent the two push parts 142 from being pushed simultaneously. That is, the support part 144 may be provided such that the two push parts 142 cannot be pushed simultaneously. As a result, when the user pushes a portion of the front panel 20 between the two push parts 142, i.e. the support part 144, the front panel 20 may not be pushed.

When the user inputs a desired command through one of the push parts 142, therefore, it is possible to prevent another push part 142 from being pushed simultaneously.

The support part 144 may be made of a material that is capable of withstanding force generally applied by the user.

Referring to FIG. 13B, in a case in which the two push parts 142 simultaneously generate signals when the user pushes a portion of the front panel 20 between the two push parts 142, it may be determined that the user has not pushed any one of the two push parts 142.

That is, in a case in which the two push parts 142 simultaneously generate signals, it may be determined that both the two push parts 142 have not been pushed.

Even in a case in which signals having substantially the same magnitude are generated by the two push parts 142, it may be determined that any one of the two push parts 142 has not been pushed.

The signals generated by the two push parts 142 may be transmitted to a controller, which will hereinafter be described. The controller may determine that both the two push parts 142 have not been pushed.

FIG. 13C shows that an additional push part 143 is provided between the two push parts 142. Unlike the push parts 142, the push part 143 may not generate a signal corresponding to a command input to the refrigerator.

That is, in a case in which the push part 143 generates a signal having a magnitude greater than that of a signal generated by any one of the push parts 142, the controller may determine that any one of the two push parts 142 has not been pushed. Such determination may be made by the controller after signals generated by the push parts 142 and 143 are transmitted to the controller.

The controller may recognize the signals generated by the push part 143 and the push parts 142 to compare magnitudes of the signals based on force pushing the push parts 142 and 143. In general, as the force pushing the push part 143 increases, the push part 143 generates a signal having a higher magnitude.

Further, marks of the input unit 182, from which the user can recognize pushed positions, may correspond to the push parts 142, and no mark may be provided at the push part 143 such that the user does not push the push part 143 if possible.

Figure 14:
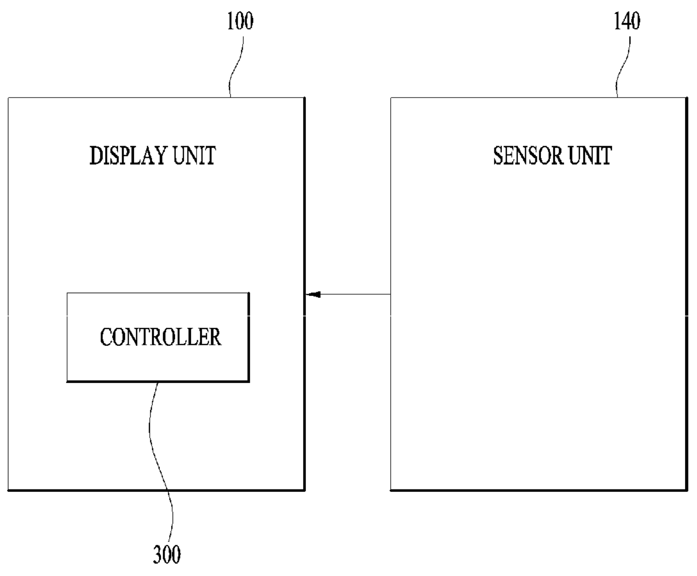
FIG. 14 is an example control block diagram of the refrigerator door according to the present application.

FIG. 14 is a control block diagram of the refrigerator door according to the present application. Hereinafter, the refrigerator door will be described with reference to FIG. 14.

In the present application, the sensor unit 140 may generate a signal when the user pushes the refrigerator door. The generated signal may be transmitted to a controller 300 provided at the display unit 100.

That is, in the present application, the sensor unit 140 may generate a signal, and the signal may not be processed by the sensor unit 140, i.e. the sensor assembly 120, but may be processed by the controller 300 provided at the display unit 100.

The sensor unit 140 is attached to the front of the front panel 20. For this reason, the sensor unit 140 may be easily affected by static electricity, etc.

In addition, in a state in which the sensor unit 140 is mounted in the front panel 20, a foam liquid is introduced into the front panel 20 such that the foam liquid is foamed in the inner space of the refrigerator door 10. As the foam liquid in the front panel 20 is heated at a high temperature, the foam liquid is foamed in the inner space of the refrigerator door 10. At this time, static electricity may be generated in the refrigerator door 10. If the foam liquid is foamed in a state in which a microprocessor, i.e. a controller, is provided at the sensor unit 140, therefore, the controller may be easily damaged due to static electricity.

In the present application, the display assembly 70 is coupled to the refrigerator door 10 after foaming is completed. Consequently, the controller 300 provided at the display unit 100 is prevented from being damaged due to static electricity generated during foaming.

In the present application, therefore, the sensor unit 140 may not include a component for processing a signal but may include only a component for generating a signal, and the generated signal may be processed by the display unit 100 physically separated from the sensor unit 140. Specifically, the controller 300, which compares and determines the signal generated by the sensor unit 140, may be provided at the PCB 102.

Figure 15:
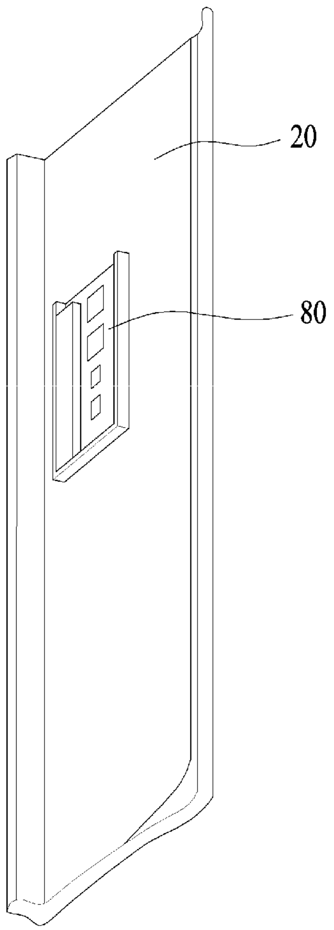
FIGS. 15 to 17 are perspective views illustrating an example process of manufacturing the refrigerator door according to the present application.
Figure 16:
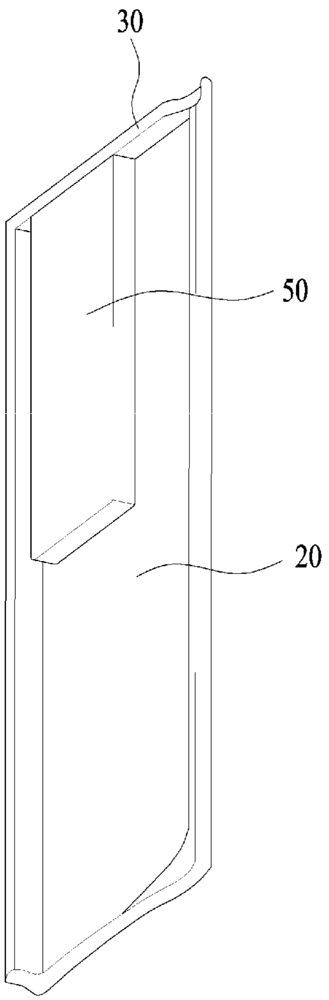
Figure 17:
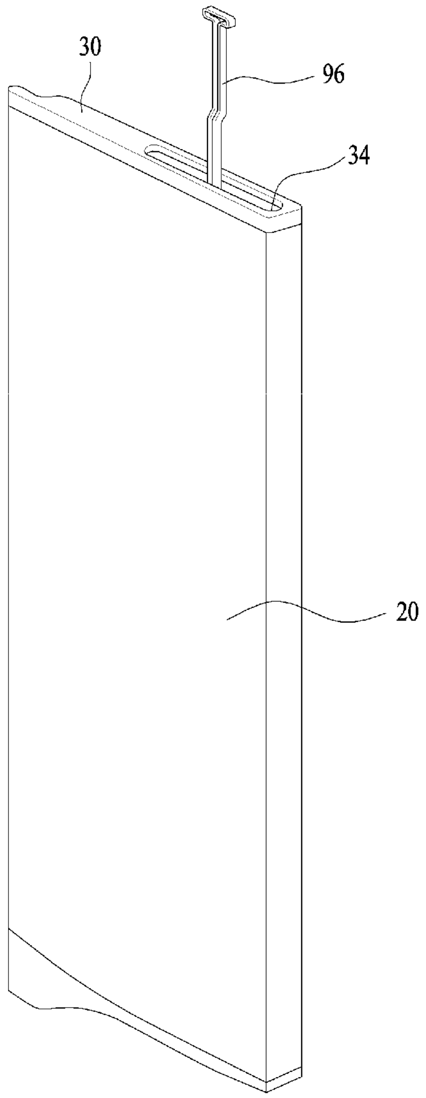
Figure 18:
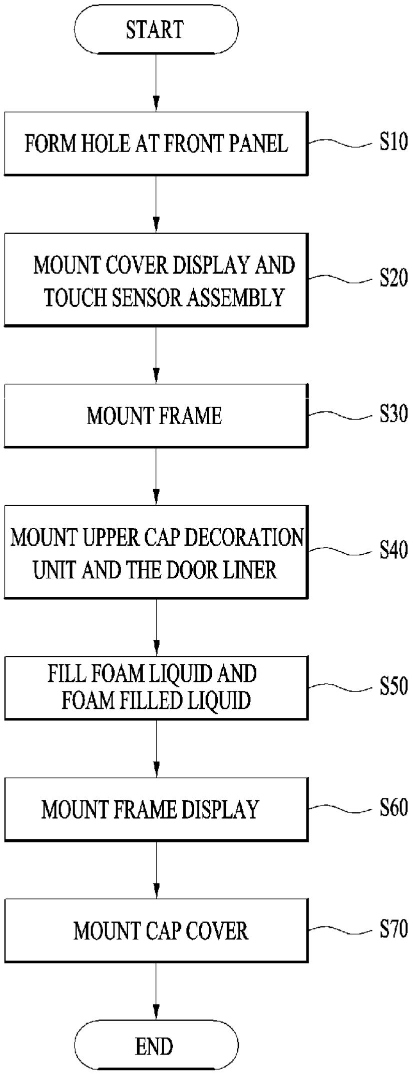
FIG. 18 is a flowchart illustrating an example manufacturing method of the refrigerator door.

FIGS. 15 to 17 illustrate an example process of manufacturing the refrigerator door according to the present application, and FIG. 18 is a flowchart illustrating a manufacturing method of the refrigerator door. Hereinafter, the manufacturing method of the refrigerator door will be described with reference to FIGS. 1 and 15 to 18.

First, the front panel 20 may be etched such that the first through hole 22 is formed through the front panel 20 (S10). At this time, the first through part 22*a* of the first through hole 22 may be formed by primary etching, and the second through part 22*b* of the first through hole 22 may be formed by secondary etching. The etching process shown in FIG. 10 may be carried out two times to form the first through part 22*a* and the second through part 22*b* of the first through hole 22. Alternatively, the etching process may be carried out simultaneously in a state in which dry films are disposed at the front and the rear of the front panel 20. Accordingly, the hole may be formed through the front panel 20 by etching.

As shown in FIG. 15, the cover display 80 and the touch sensor assembly 120 may be mounted at the front panel 20 (S20). At this time, the cover display 80 and the touch sensor assembly 120 may be attached to the rear of the front panel 20 using an adhesive member.

Since the touch sensor assembly 120 is received in the receiving unit 86 of the cover display 80, the mounting position of the touch sensor assembly 120 may be restricted by the cover display 80.

As shown in FIG. 16, the frame 50, in which the cover display 80 and the touch sensor assembly 120 are received, is mounted at the front panel 20 (S30).

Subsequently, the upper cap decoration unit 30 and the door liner 200 are mounted at the front panel 20 (S40).

At this time, the case 130 and the upper cap decoration unit 30 are coupled to each other. Consequently, the space defined by the case 130, the front panel 20, and the upper cap decoration unit 30 may be separated from the space defined by the front panel 20, the upper cap decoration unit 30, and the door liner 200.

Subsequently, a foam liquid is filled in the space defined by the front panel 20, the door liner 200, and the upper cap decoration unit 30 such that the foam liquid is foamed in the space (S50).

The foam liquid is filled in the space defined by the front panel 20, the upper cap decoration unit 30, and the door liner 200 but is not filled in the space defined by the upper cap decoration unit 30, the front panel 20, and the case 130

The foam liquid is filled and heated in the space defined by the front panel 20, the upper cap decoration unit 30, and the door liner 200 in a state in which only the cover display 80 of the display assembly is mounted at the case 130. Since static electricity may be generated during foaming, it is necessary to foam the foam liquid in a state in which any electric device, such as the PCB, is not mounted at the refrigerator door 10. In the present application, therefore, the frame display 90 is coupled to the cover display 80 after foaming is completed. At this time, a microprocessor, i.e. a controller, is not provided at the cover display 80 or the touch sensor assembly 120. Consequently, the controller is not damaged due to static electricity generated during foaming.

After foaming is completed, as shown in FIG. 17, the frame display 90 is coupled to the cover display 80 (S60).

At this time, the frame display 90 may be coupled to the cover display 80 through the communication hole 34 in a state in which the display unit 100 is coupled to the frame display 90. The frame display 90 may be slidably coupled to the cover display 880.

At this time, the display assembly 70 and the touch sensor assembly 120 may be electrically connected to each other via an electric wire.

Subsequently, the communication hole 34 of the upper cap decoration unit 30 may be sealed by the cap cover 36 (S70).

Figure 19:
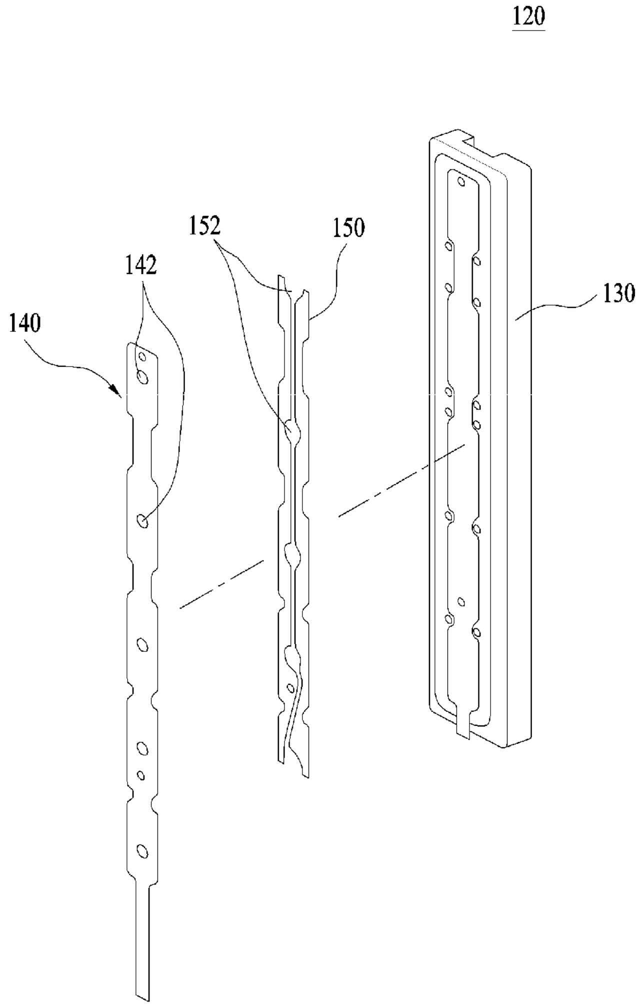
FIG. 19 is an exploded perspective view showing a modification of the touch sensor assembly.
Figures 20, 21:
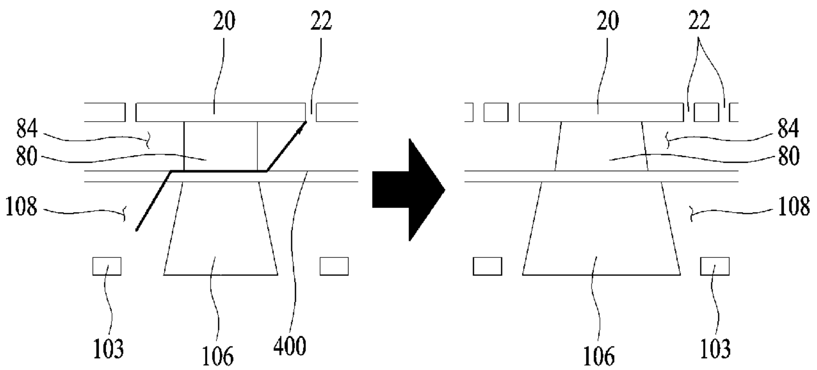
FIG. 20 is a table showing example experimental results on the touch sensor assembly shown in FIG. 19.
FIG. 21 is a cross-sectional view showing example states in which the display assembly is coupled to a front panel.

FIG. 19 is an exploded perspective view showing a modification of the touch sensor assembly, and FIG. 20 is a view showing experimental results on the touch sensor assembly shown in FIG. 19. Hereinafter, the touch sensor assembly will be described with reference to FIGS. 19 and 20.

The touch sensor assembly of FIG. 19 is different from that of FIG. 6 in terms of the shape of the adhesive member

150. For example, the length of the adhesive member 150 may be less than that of the sensor unit 140.

In addition, the adhesive member 150 may include two elongated member parts separated from each other on the basis of the push parts 142. Even at the uppermost push part and the lowermost push part, the adhesive member 150 may be disposed at opposite sides of the push parts 142 in a separate state.

A plurality of push parts 142 may be arranged at the sensor unit 140 in a line. For example, five push parts 142 may be arranged at the sensor unit 140.

In a case in which the adhesive member 150 is disposed as shown in FIG. 6, it can be seen that larger forces are needed to push the uppermost push part (number 1) and the lowermost push part (number 5) than to push the other push parts (numbers 2 to 4) as shown in the left side of FIG. 20 corresponding to the implementation.

In a case in which the adhesive member 150 is disposed as shown in FIG. 19, on the other hand, it can be seen that forces needed to push the uppermost push part (number 1) and the lowermost push part (number 5) are reduced as shown in the right side of FIG. 20 corresponding to the modification.

That is, the shape of the adhesive member 150 may be restricted such that the adhesive member 150 is disposed only at the opposite sides of the push parts 142 but is not disposed at the upper and lower ends of the push parts 142.

The adhesive member 150 is disposed between the sensor unit 140 and the case 130 to provide an adhesive force between the sensor unit 140 and the case 130. Consequently, the adhesive member 150 may provide a repulsive force against the force pushing the sensor unit 140, and therefore the shape of the adhesive member 150 may be restricted such that the adhesive member 150 is disposed at the rear of the sensor unit over a small area.

Referring now to FIG. 21, between the cover display 80 and the reflector 106 may be provided a diffusion plate 400, through which light may be transmitted. The diffusion plate 400 may have substantially the same size as one major surface of the reflector 106 such that the diffusion plate 400 can cover the entirety of one major surface of the reflector 106.

The diffusion plate 400 may be made of a transparent material such that light emitted from the LED 103 can be transmitted to the first through hole 22 through the diffusion plate 400.

The diffusion plate 400 may diffuse some of the light emitted from the LED 103 such that the light can spread through the first through holes 22.

Meanwhile, in a case in which the sectional sizes of the portions of the second through hole 84 and the third through hole 108 adjacent to the diffusion plate 400 are the same as shown in the left side of FIG. 21, light emitted from the LED 103 designed to pass through one third through hole 108 may move to another third through hole 108 through the diffusion plate 400. As a result, desired information may not be provided to the user through the display unit 100.

For this reason, as shown in the right side of FIG. 21, the second through hole 84 and the third through hole 108 may be configured such that the sectional sizes of the portions of the second through hole 84 and the third through hole 108 adjacent to the diffusion plate 400 are different from each other.

For example, the size of the portion of the second through hole 84 adjacent to the diffusion plate 400 may be less than that of the portion of the third through hole 108 adjacent to the diffusion plate 400. In a case in which the second through hole 84 and the third through hole 108 are configured as shown in the right side of FIG. 21, it is possible to prevent a phenomenon generated at the left side of FIG. 21, i.e. a phenomenon that light is transmitted through any undesired one of the first through holes 22.

In the present application, therefore, the second through hole 84 and the third through hole 108 may be configured such that the second through hole 84 and the third through hole 108 have different shapes as shown in the right side of FIG. 21. In a case in which the sectional size of the third through hole 108 is reduced, the strength of the reflector 106 may increase.

Figure 22:
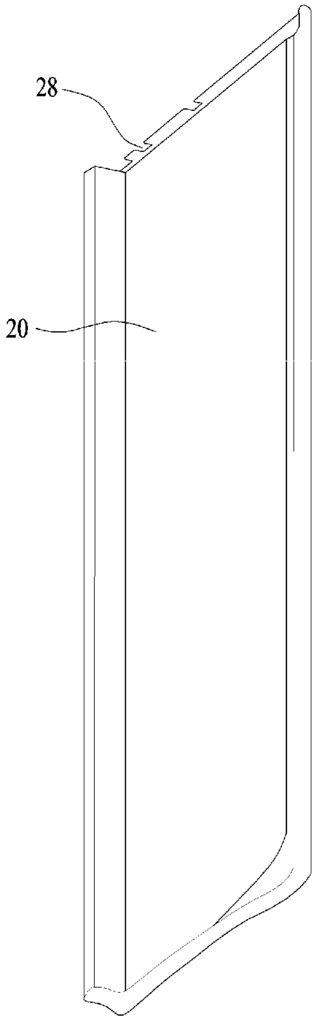
FIGS. 22 and 23 are perspective views illustrating an example implementation of FIG. 15.
Figure 23:
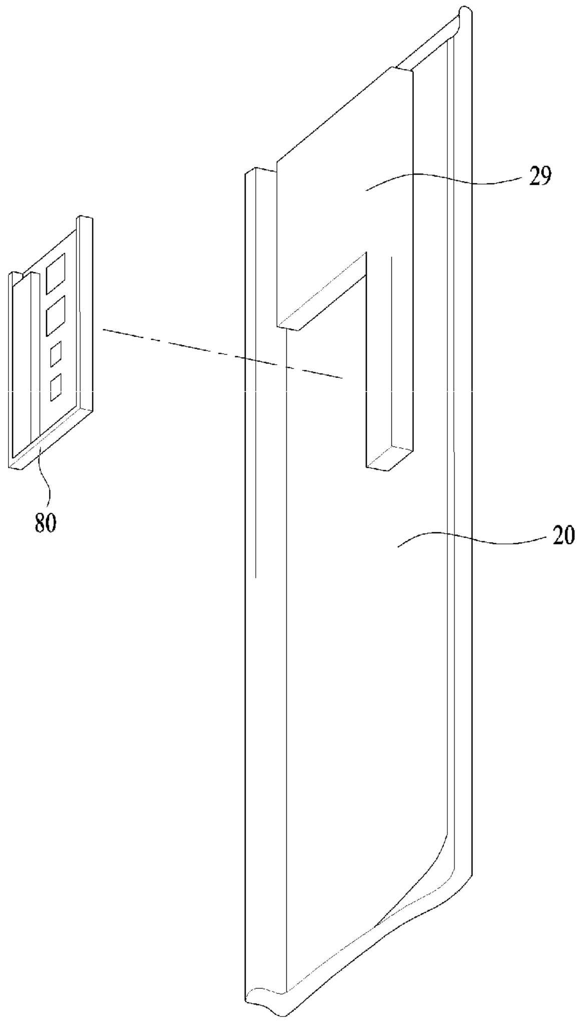

FIGS. 22 and 23 illustrate an implementation of the example of FIG. 15.

When the cover display 80 is mounted at the front panel 20, it is necessary to achieve communication between the first through hole 22 and the second through hole 84. If the cover display 80 is not mounted at a designed position of the front panel 20, light emitted from the LED 103 of the display unit 100 may not be transmitted through the first through hole 22 with the result that desired information may not be provided to the user.

In order to accurately mount the cover display 80 at the front panel 20, a reference groove 28 may be formed at one side of the front panel 20.

A jig 29 may be provided with a protrusion, which is engaged in the reference groove 28 to specify the position of the jig 29.

The jig 29 may be located at the reference groove 28, and the cover display 80 may be disposed at one side of the jig 29 to fix the cover display 80 at a desired position of the front panel 20.

After the cover display 80 is mounted at the front panel 20, the jig 29 may be removed, and then the cover display may be mounted at a desired position of the front panel 20 as shown in FIG. 15.

That is, when the refrigerator door 10 is manufactured, the jig 29 may be disposed at the front panel to confirm the fixed position of the cover display 80 before the cover display 80 is mounted at the front panel 20.

Since the front panel 20 is made of a steel material, it may be difficult to form a protruding structure, such as a protrusion, for locating the cover display 80. For this reason, the reference groove 28, in which the jig 29 is engaged, may be formed at the edge of the front panel 20 to specify the position of the cover display 80.

Figure 24:
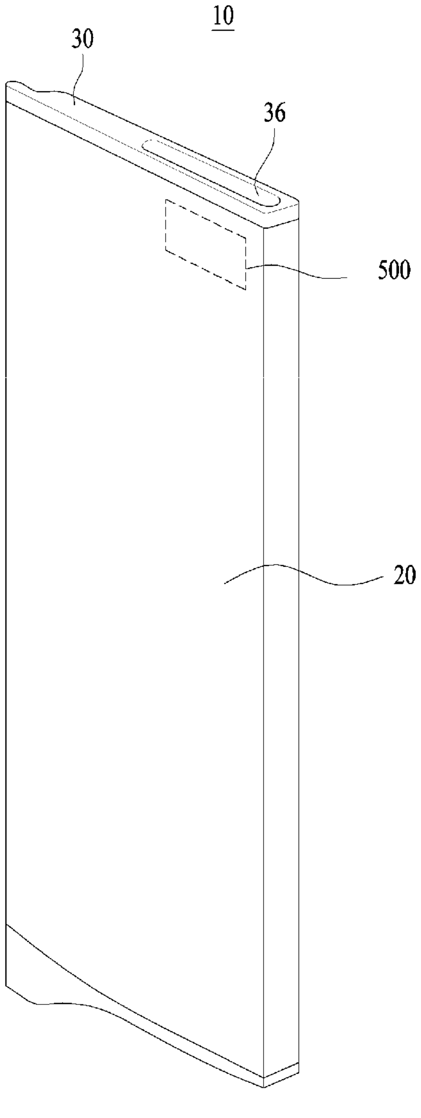
FIG. 24 is a perspective view showing a refrigerator door according another implementation of the present application.
Figure 25:
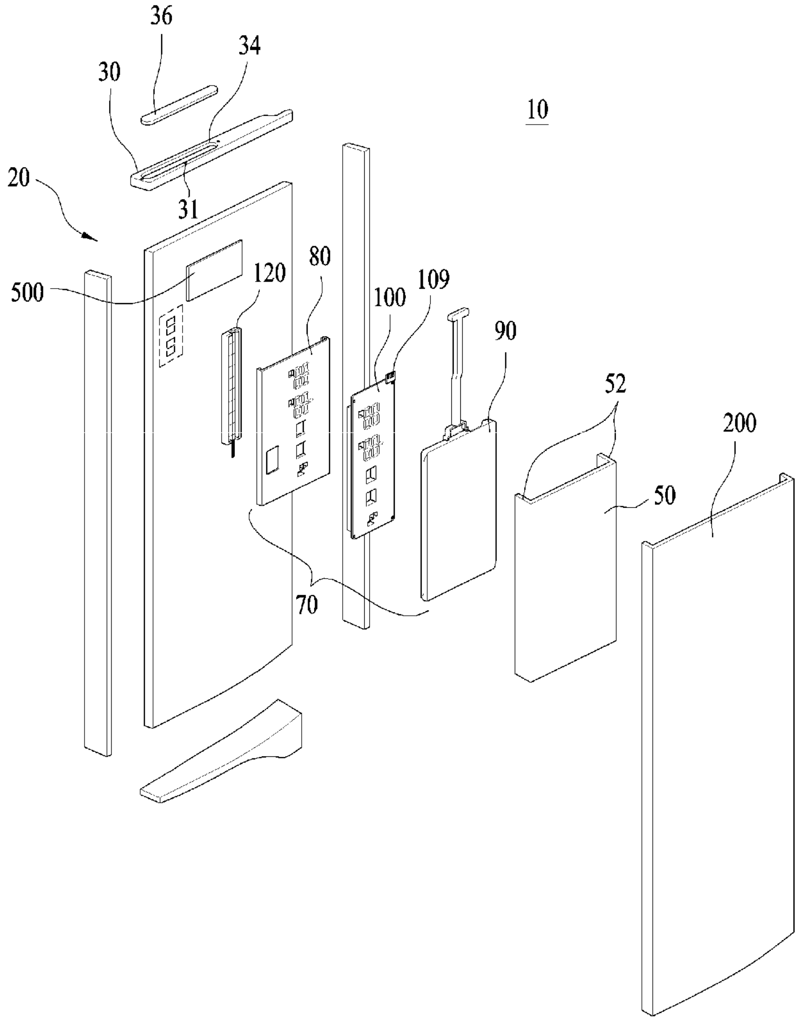
FIG. 25 is an exploded perspective view showing a principal part of the refrigerator door shown in FIG. 24.

Referring to FIGS. 24 and 25, the upper cap decoration unit 30 is provided with a fastening hole 31, through which the upper cap decoration unit 30 is coupled to the frame 50, unlike the implementation shown in FIGS. 2 and 3. When foaming of the refrigerator door is carried out in a state in which the upper cap decoration unit 30 is mounted, therefore, a fixing force for withstanding foaming pressure may be increased. A fastening member, such as a bolt, may be fastened in the fastening hole 31 to fix the upper cap decoration unit 30 to the frame 50.

In addition, a reinforcement member 500 for increasing the strength of the front panel 20 may also be mounted at the front panel 20. The reinforcement member 500 may be disposed at the rear of the front panel 20, i.e. the inside of the refrigerator door, such that the reinforcement member 500 is not exposed to the user.

The reinforcement member 500 may be disposed in a space defined between the frame 50 and the front panel 20 at a height corresponding to the bar 96. In the space between the frame 50 and the front panel 20, the location piece 92, the PCB 102, and the cover display 80 are disposed at the positions at which the frame display 90 and the display unit 100 are adjacent to the frame 50. Consequently, the strength of the front panel 20 can be increased.

At the height corresponding to the bar 96, however, an empty space is formed from the rear of the front panel to the frame 50. As the user repeatedly pushes the front panel 20 or the refrigerator door is deteriorated, a corresponding portion of the front panel 20 may be deformed. When the user pushes the front panel 20, therefore, the front panel 20 may be depressed. In the present application, therefore, the reinforcement member 500 for increasing the strength of the front panel 20 is mounted at the corresponding portion of the front panel 20.

The reinforcement member 500 may be a plate made of a material similar to that of the front panel 20. Alternatively, the reinforcement member 500 may be made of various materials excluding metal.

Figure 26:
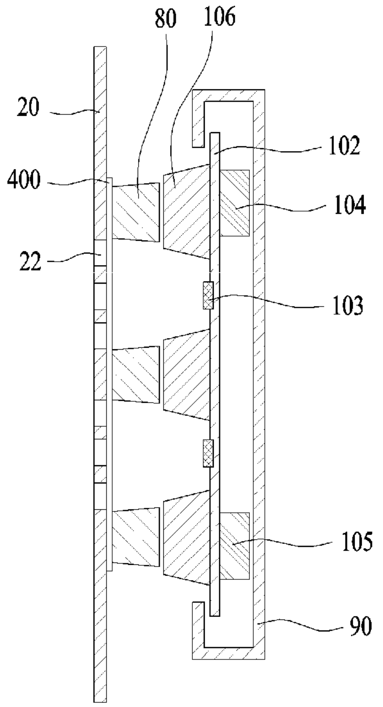
FIG. 26 is a cross-sectional view showing a principal part of an example modification of the refrigerator door shown in FIG. 9.

Referring to FIG. 26, the diffusion plate 400 for diffusing light is mounted at the inside of the front panel 20. Consequently, light emitted from the LED 103 mounted at the PCB 102 may pass through the diffusion plate 400. At this time, the light is diffused by the diffusion plate 400 and is then transmitted to the user through the first through hole 22.

The diffusion plate 400, the cover display 80, the reflector 106, and the PCB 102 are sequentially disposed from the inside of the front panel 20.

The diffusion plate 400 may be made of a transparent material such that light can be transmitted through the diffusion plate 400. In addition, the diffusion plate 400 may have a predetermined thickness such that the light is guided and diffused through the diffusion plate 400.

In addition, the LED 103 is mounted at one major surface of the PCB 102. On the other hand, an LED control chip 105 for controlling the LED may be mounted at the other major surface of the PCB 102 at which the LED 103 is not mounted. In addition, a sensor unit control chip 104 for controlling the sensor unit 140 of the touch sensor assembly 120 may be mounted at the other major surface of the PCB 102 at which the LED 103 is not mounted. The sensor unit control chip 104 and the LED control chip 105 may be mounted at the other major surface of the PCB 102 opposite to one major surface of the PCB 102 at which the LED 103 is mounted. Consequently, the PCB 102 may be disposed at the reflector 106 in tight contact.

The PCB 102 may be a double-sided PCB having patterns printed on opposite major surfaces thereof.

The frame display 90 may be provided at the opposite ends thereof with guide grooves, along which the PCB 102 may be slidably coupled to the frame display 90, The components which are shown in FIG. 9 but are not shown in FIG. 26 may be identically or similarly applied to the refrigerator door of FIG. 26 although the components are omitted from FIG. 26

Figure 27:
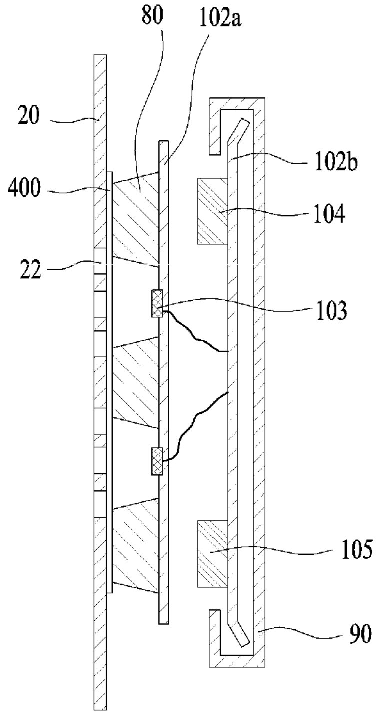
FIG. 27 is a cross-sectional view showing a principal part of another example modification of the refrigerator door shown in FIG. 9.

Referring to FIG. 27, two PCBs, i.e. a first PCB 102*a* and a second PCB 102*b*, may be provided unlike FIG. 26. The first PCB 102*a* and the second PCB 102*b* each may be a single-sided PCB having a pattern printed on one major surface thereof.

An LED 103 for emitting light may be provided at the first PCB 102*a*. On the other hand, a LED control chip 105 for controlling the LED and a sensor unit control chip 104 for controlling the sensor unit 140 may be provided at the second PCB 102*b*. The first PCB 102*a* and the second PCB 102*b* may be physically separated from each other and may be electrically connected to each other via an electric wire.

The first PCB 102*a* may be coupled to the cover display 80 such that the first PCB 102*a* is thus attached to the front panel 20.

On the other hand, the second PCB 102*b* may be fixed to the frame display 90 such that the second PCB 102*b* can slide relative to the cover display 80.

That is, the first PCB 102*a* may be fixed to the inside of the front panel 20 together with the cover display 80. On the other hand, the second PCB 102*b* may be fixed to the frame display 90. Consequently, the first PCB 102*a* and the second PCB 102*b* may be separately assembled.

Since those skilled in the art can sufficiently apply the components shown in FIG. 9 to FIG. 27, a detailed description of the components shown in FIG. 9 but not shown in FIG. 27 will be omitted as in FIG. 26.

The diffusion plate 400, which diffuses light such that the light is uniformly emitted, is located on a path of the light. In the implementation of the present application, the diffusion plate 400 is disposed at the final position at which light is transmitted from the LED 103 to the user. This is because it is possible to design the diffusion plate 400 in consideration of diffusion of light per unit of the LED 103.

For example, a first reflector assembled to the front panel may be configured as a first assembly unit, and a second reflector, to which the LED and the PCB are assembled, may be configured as a second assembly unit. In this case, the diffusion plate 400 may be provided at the second reflector configured as the second assembly unit. That is, the first reflector may be attached to the front panel. On the other hand, the second reflector may be assembled to the first reflector using an additional frame.

In the structure in which the diffusion plate is provided at the second reflector, however, when light is emitted to the front of the front panel through the through hole formed at the front panel, the intensity of the light may not be uniform. In a case in which a position at which the light is diffused (by the diffusion plate) and a position at which the light is radiated through the through hole (after passing through the through hole of the front panel) are different from each other, the light may be nonuniform therebetween. Such nonuniformity of the light may be caused by refraction, air resistance, etc. due to various components located on the path of the light disposed between the through hole formed at the front panel and the diffusion plate.

In the implementation of the present application, therefore, the diffusion plate 400 may be disposed at the inside of the front panel in contact such that the light emitted from the LED 103 can pass through the first through hole 22 and then be uniformly transmitted to the user.

A mark for mounting the diffusion plate 400 may be formed at the rear of the front panel 20 such that the diffusion plate 400 can be fixed at a desired position when the diffusion plate 400 is attached to the rear of the front panel 20. The mark may be a protrusion, a pattern, a color, or a figure.

According to the implementation of the present application, the diffusion plate 400 may be directly attached to the rear of the front panel 20 such that the light emitted through the front panel 20 can be uniformly transmitted to the user. In particular, even when any design change is carried out to change the intensity of light emitted from the LED, it is possible to keep uniformity of the light transmitted to the user due to the position of the diffusion plate 400.

As is apparent from the above description, according to the present application, the front of the refrigerator door may be made of a steel material. Consequently, it may be possible to provide a refrigerator made of the steel material to a user.

In addition, according to the present application, no additional component may be attached to the front of the front panel made of a steel material. Consequently, it may be possible to neatly configure the front of the refrigerator door.

In addition, according to the present application, the refrigerator door can be easily assembled. Consequently, it may be possible to reduce assembly cost.

In addition, according to the present application, holes can be formed at the front panel by etching. Consequently, it may be possible to manufacture the front panel with lower manufacturing cost than when a laser machining apparatus is used.

It will be apparent to those skilled in the art that various modifications and variations can be made in the present application without departing from the spirit or scope of the application. Thus, it is intended that the present application covers the modifications and variations of this application provided they come within the scope of the appended claims and their equivalents.

What is claimed is:

1. A refrigerator door comprising:

a front panel made of a steel material, the front panel being provided at a front of the refrigerator door and forming a front appearance of the refrigerator door, the front panel including a first through hole and an input unit;

a door liner forming a rear appearance of the refrigerator door;

an upper cap decoration unit configured to seal an upper side of a first space defined between the front panel and the door liner;

a frame attached to an inside of the front panel and defining a second space that is separated from the first space defined by the front panel, the door liner, and the upper cap decoration unit;

a display assembly provided between the frame and the front panel and configured to emit light through the first through hole; and a touch sensor assembly provided between the frame and the front panel, the touch sensor assembly being fixed to a rear of the front panel at a position that corresponds to a location of the input unit, wherein the upper cap decoration unit includes a communication hole for communicating with the second space defined between the frame and the front panel and includes a cap cover configured to seal the communication hole.

2. The refrigerator door according to claim 1, wherein the display assembly comprises:

a cover display mounted at the front panel;

a frame display slidably coupled to the cover display; and a display unit coupled to the frame display.

3. The refrigerator door according to claim 2, wherein the cover display is provided at opposite ends of the refrigerator door via guide rails that are configured to receive and fix the frame display.

4. The refrigerator door according to claim 3, wherein each of the guide rails includes a protruding guide member that is configured to guide the display unit such that the display unit moves toward the front panel, and the frame display includes a protrusion that is configured to guide the display unit such that the display unit moves toward the front panel.

5. The refrigerator door according to claim 2, wherein the cover display includes a second through hole that communicates with the first through hole.

6. The refrigerator door according to claim 2:

wherein the display unit comprises a reflector including a third through hole and a printed circuit board (PCB) coupled to the reflector, and a light emitting diode (LED) mounted at the PCB, the LED being disposed to emit light through the third through hole, wherein the third through hole communicates with the first through hole and the second through hole, and wherein the PCB is provided at a surface of the display unit facing the frame display.

7. The refrigerator door according to claim 6, wherein the display unit further comprises a diffusion plate disposed between the reflector and the PCB, and a size of the third through hole is less than that of the second through hole at a connection point between the third through hole and the second through hole.

8. The refrigerator door according to claim 2, wherein the frame display comprises a location piece on which the display unit is located, and a bar extending from the location piece, the bar having a step piece, the frame includes an inclined part configured to change a distance between the frame and the front panel, and the communication hole is spaced apart from a contact portion between the upper cap decoration unit and the front panel.

9. The refrigerator door according to claim 2, wherein the touch sensor assembly comprises:

a sensor unit mounted at the front panel, the sensor unit being in direct contact with the front panel; and a case in which the sensor unit is mounted.

10. The refrigerator door according to claim 9, wherein the cover display is provided at a surface of the refrigerator door to face the front panel, the cover display having a receiving unit configured to receive the touch sensor assembly, the receiving unit including a depression of a predetermined depth, and the receiving unit includes an elastic member configured to elastically support the sensor unit such that the sensor unit is pressed against the front panel by the elastic member.

11. The refrigerator door according to claim 9, wherein the sensor unit comprises a plurality of push parts each configured to generate a signal based on being pushed, and the display assembly comprises a controller configured to determine, based on two or more of the push parts being simultaneously pushed to generate signals, that the push parts have not been intentionally pushed.

12. The refrigerator door according to claim 9, wherein the sensor unit comprises a plurality of push parts each configured to generate a signal based on being pushed, and the display assembly comprises a controller configured to selectively determine, based on one of the push parts generating a signal having a magnitude greater than that of a signal generated by another of the push parts, that at least one of the push parts has been unintentionally pushed.

13. The refrigerator door according to claim 1, wherein the first through hole comprises a first through part located at a rear of the front panel, the first through part being formed by etching, and a second through part located at a front of the front panel, the second through part being formed by etching, the first through part and the second through part communicate with each other such that the first through hole is formed through the front panel from the front to the rear of the front panel, and the first through part and the second through part have different sectional sizes.

14. A manufacturing method of a refrigerator door comprising:

mounting, at a front panel, a cover display and a touch sensor assembly;

mounting, at the front panel, a frame configured to receive the cover display and the touch sensor assembly;

mounting, at the front panel, an upper cap decoration unit and a door liner;

filling a space defined by the front panel, the door liner, and the upper cap decoration unit with a foam liquid and foaming the foam liquid; and mounting, at the cover display, a frame display having a display unit fixed to the frame display.

15. The manufacturing method according to claim 14, further comprising slidably coupling the frame display to the cover display through a communication hole included at the upper cap decoration unit.

16. The manufacturing method according to claim 14, further comprising electrically connecting the display unit and the touch sensor assembly to each other via an electric wire after the foaming step.

17. The manufacturing method according to claim 14, further comprising:

performing a primary etching step on a rear of the front panel; and performing a secondary etching step on a front of the front panel before the step of mounting the cover display and the touch sensor assembly at the front panel, wherein the secondary etching step is carried out after the primary etching step.

18. The manufacturing method according to claim 17, wherein:

the primary etching step comprises forming a first through part; and the secondary etching step comprises forming a second through part such that a portion of the second through part disposed at the front of the front panel has a larger section than the first through part.

19. A refrigerator door comprising:

a front panel made of a steel material, the front panel being provided at a front of the refrigerator door and forming a front appearance of the refrigerator door, the front panel including a first through hole and an input unit;

a door liner forming a rear appearance of the refrigerator door;

an upper cap decoration unit configured to seal an upper side of a first space defined between the front panel and the door liner;

a frame attached to an inside of the front panel and defining a second space that is separated from the first space defined by the front panel, the door liner, and the upper cap decoration unit;

a display assembly provided between the frame and the front panel and configured to emit light through the first through hole; and a touch sensor assembly provided between the frame and the front panel, the touch sensor assembly being fixed to a rear of the front panel at a position that corresponds to a location of the input unit; and a diffusion plate provided between the inside of the front panel and the display assembly and configured to diffuse light, the diffusion plate being in contact with one side of the first through hole.

20. The refrigerator door according to claim 19, wherein the front panel includes a plurality of first through holes, and wherein the diffusion plate is attached to the front panel such that it covers one side of each of the plurality of first through holes.

* * * * *